US008787508B2

(12) United States Patent  
Ren et al.

(10) Patent No.: US 8,787,508 B2
(45) Date of Patent: Jul. 22, 2014

(54) CHANNEL ESTIMATION METHOD AND APPARATUS

(71) Applicant: Huawei Technologies Co., Ltd., Guangdong (CN)

(72) Inventors: Guangliang Ren, Shenzhen (CN); Lihua Yang, Shenzhen (CN); Hongbin Zhou, Shanghai (CN); Hui Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/914,048

(22) Filed: Jun. 10, 2013

(65) Prior Publication Data

US 2013/0343499 A1 Dec. 26, 2013

Related U.S. Application Data

(63) Continuation of application No. PCT/CN2011/078837, filed on Aug. 24, 2011.

(30) Foreign Application Priority Data

Dec. 10, 2010 (CN) .......................... 2010 1 0583421

(51) Int. Cl.
*H03D 1/04* (2006.01)
(52) U.S. Cl.
USPC ........................................................ 375/346
(58) Field of Classification Search
USPC ................................................ 375/232, 346
See application file for complete search history.

(56) References Cited

U.S. PATENT DOCUMENTS

| 6,654,429 | B1 * | 11/2003 | Li ................................. 375/316 |
| 8,160,164 | B2 * | 4/2012 | McNamara .................... 375/260 |
| 2007/0211827 | A1 | 9/2007 | Baggen et al. |
| 2009/0161773 | A1 * | 6/2009 | Rajagopal ...................... 375/260 |
| 2010/0106628 | A1 | 4/2010 | Ross et al. |
| 2011/0305286 | A1 * | 12/2011 | Shimezawa et al. .......... 375/260 |
| 2013/0058443 | A1 * | 3/2013 | Carbonnelli et al. ......... 375/350 |

FOREIGN PATENT DOCUMENTS

| CN | 1463151 A | 12/2003 |
| CN | 1998206 A | 7/2007 |
| CN | 101414986 A | 4/2009 |
| CN | 101729456 A | 6/2010 |
| CN | 101808053 A | 8/2010 |
| CN | 102035767 A | 4/2011 |

OTHER PUBLICATIONS

Xin Xu, et al., "Performance Comparison of Pilot symbolized Channel Estimation Methods for Wireless Ofdm Systems", Journal of PLA University of Science and Technology, vol. 4, No. 6, Dec. 2003.

(Continued)

*Primary Examiner* — Jaison Joseph

(57) ABSTRACT

A channel estimation method and apparatus are provided. The channel estimation method includes: extracting pilot data in a received signal; performing pilot channel estimation by using the extracted pilot data to obtain transmission coefficients of multiple groups of pilot channels; and obtaining a transmission coefficient of a data channel through non-linear interpolation processing by using the obtained transmission coefficients of the multiple groups of pilot channels. Solutions provided in the embodiments of the present invention help improve the channel estimation precision in a fast time-changing channel environment, thereby improving the system performance.

12 Claims, 13 Drawing Sheets

(56) References Cited

OTHER PUBLICATIONS

Sinem Coleri, et al., "Channel Estimation Techniques Based on Pilot Arrangement in OFDM Systems", IEEE Transactions on Broadcasting, vol. 48, No. 3, Sep. 2002, p. 223-229.

Shankar Balasubramanian, et al., "Pilot Embedding for Channel Estimation and Tracking in OFDM Systems", IEEE Communications Society, Globecom 2004, p. 1244-1248.

Jae Kyoung Moon, et al., "Performance of Channel Estimation Methods for OFDM Systems in a Multipath Fading Channels", 2000 IEEE, p. 161-170.

Bingyang Wu, et al., "Analysis of Decision Aided Channel Estimation in Clipped OFDM", 2005 IEEE, p. 1030-1130.

"3rd Generation Partnership Project; Technical Specification Group Radio Access Network; Evolved Universal Terrestrial Radio Access (E-UTRA); Physical Channels and Modulation (Release 8)", 3GPP TS 36.211 v8.7.0 (May 2009), 83 pages.

International Search Report dated Nov. 24, 2011 in connection with International Patent Application No. PCT/CN2011/078837.

Bahattin Karakaya, et al., "Channel Estimation for LTE Uplink in High Doppler Spread", IEEE 2008, p. 1126-1130.

* cited by examiner

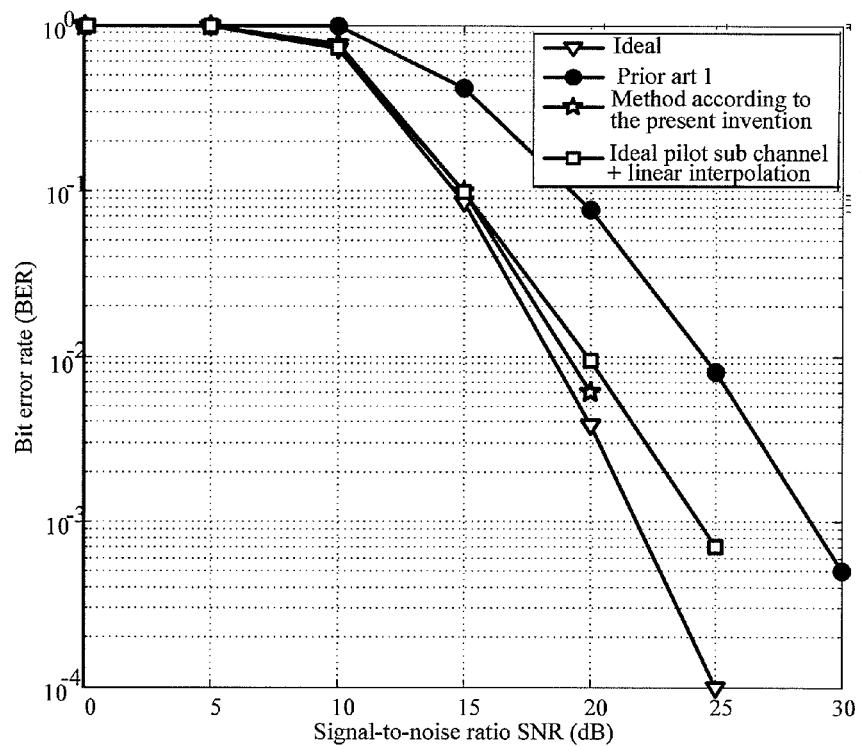
FIG. 14
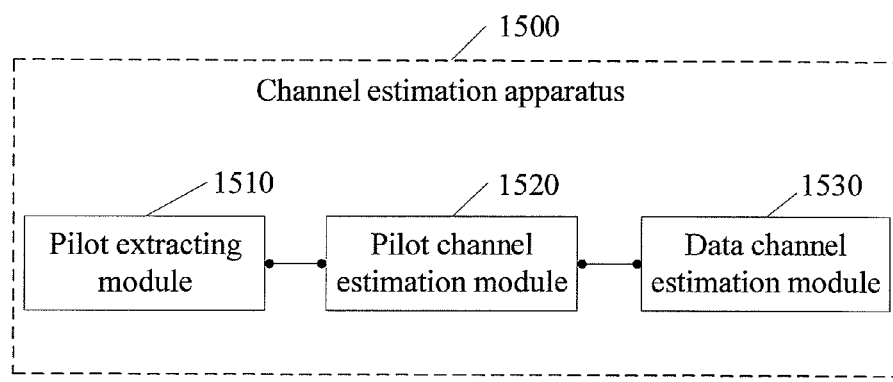
FIG. 15-a

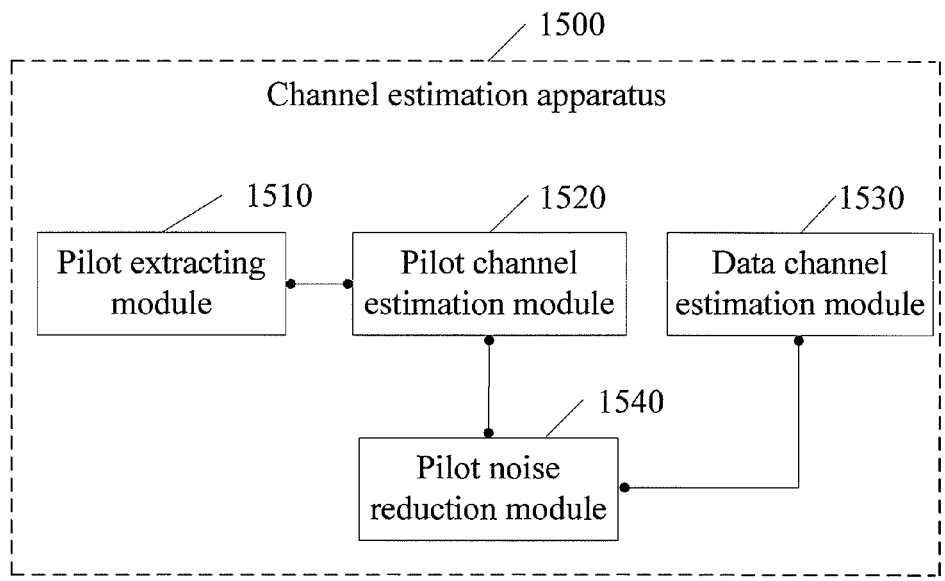
FIG. 15-b
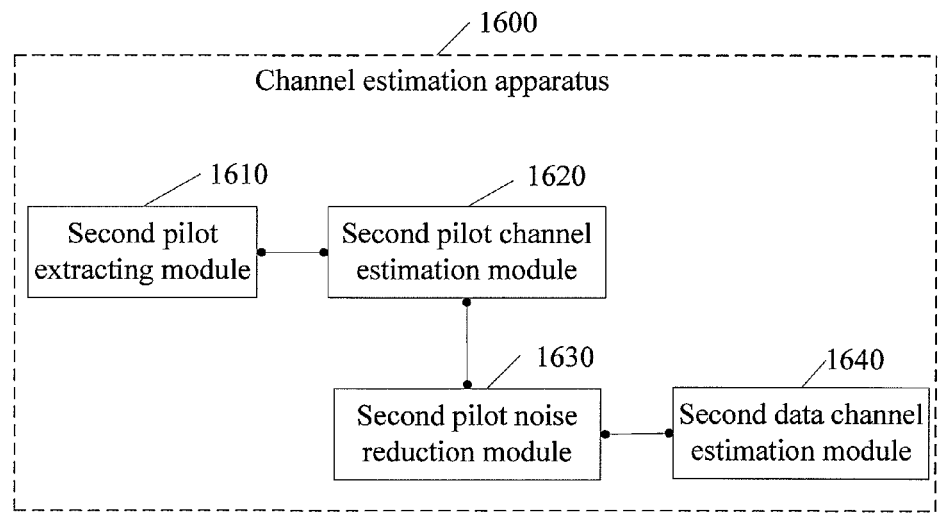
FIG. 16

CHANNEL ESTIMATION METHOD AND APPARATUS

CROSS-REFERENCE TO RELATED APPLICATIONS

This application is a continuation of International Application No. PCT/CN2011/078837, filed on Aug. 24, 2011, which claims priority to Chinese Patent Application No. 201010583421.3, filed on Dec. 10, 2010, both of which are hereby incorporated by reference in their entireties.

TECHNICAL FIELD

The present invention relates to the field of communications technologies, and in particular, to a channel estimation method and apparatus.

BACKGROUND

At present, as high-speed transportation carriers such as high-speed railways are constantly built, commissioned, and put into use, the issue of high-speed information transmission between the next-generation mobile communications system and users in high-speed movement needs to be considered.

In high-speed movement, the large Doppler frequency shift that is generated makes, for example, long term evolution-time division duplex (LTE-TDD, Long Term Evolution-Time Division Duplex) downlink channels produce fast changes. Fast changing channels damage the orthogonal nature between subcarriers of the orthogonal frequency division multiplexing system, leading to inter-channel interference (ICI, Inter-channel interference). The channel changes between symbols produce time selective fading, lowering the system performance. When the pilot insertion mode and density are not changed, the fast changing channels lower the channel estimation precision of the existing channel estimation method of least square (LS, Least Square)+linear interpolation, and degrade the system performance.

Precise channel estimation is an important basis for performing interference cancellation between subcarriers, overcoming time selective fading, and improving balanced system performance. As the practice shows, the existing channel estimation method (LS+linear interpolation) may obtain favorable channel estimation precision when being applied to a slow fading channel environment, but generally cannot obtain channel estimation precision that meets communications needs when being applied to a fast time-changing channel environment such as high-speed railway, thereby affecting the system performance.

SUMMARY

Embodiments of the present invention provide a channel estimation method and apparatus to improve the channel estimation precision in a fast time-changing channel environment, thereby improving the system performance.

In order to solve the foregoing technical problems, the embodiments of the present invention provide the following technical solutions.

A channel estimation method includes:
extracting pilot data in a received signal;
performing pilot channel estimation by using the extracted pilot data to obtain transmission coefficients of multiple groups of pilot channels; and
obtaining a transmission coefficient of a data channel through non-linear interpolation processing by using the obtained transmission coefficients of the multiple groups of pilot channels.

A channel estimation apparatus includes:
a pilot extracting module, configured to extract pilot data in a received signal;
a pilot channel estimation module, configured to perform pilot channel estimation by using the pilot data extracted by the pilot extracting module to obtain transmission coefficients of multiple groups of pilot channels; and
a data channel estimation module, configured to obtain a transmission coefficient of a data channel through non-linear interpolation processing by using the transmission coefficients of the multiple groups of pilot channels obtained by the pilot channel estimation module.

As such, according to the embodiments of the present invention, the pilot data extracted from the received signal is used for pilot channel estimation to obtain transmission coefficients of multiple groups of pilot channels, and then the obtained transmission coefficients of the multiple groups of pilot channels are used to obtain the transmission coefficient of the data channel through non-linear interpolation processing. Acquiring the transmission coefficient of the data channel based on the non-linear interpolation processing mechanism helps improve the channel estimation precision in a fast time-changing channel environment and thereby helps improve the system performance.

BRIEF DESCRIPTION OF THE DRAWINGS

To illustrate the technical solutions in the embodiments of the present invention more clearly, the following briefly describes the accompanying drawings required for describing the embodiments. Apparently, the accompanying drawings in the following description merely show some embodiments of the present invention, and those of ordinary skill in the art can derive other drawings from these accompanying drawings without creative efforts.

FIG. 14 is another schematic diagram of comparison of channel estimation performance according to an embodiment of the present invention;

FIG. 15-a is a schematic diagram of a channel estimation apparatus according to an embodiment of the present invention;

FIG. 15-b is a schematic diagram of another channel estimation apparatus according to an embodiment of the present invention; and FIG. 16 is a schematic diagram of another channel estimation apparatus according to an embodiment of the present invention.

DETAILED DESCRIPTION

Embodiments of the present invention provide a channel estimation method and apparatus to improve the channel estimation precision in a fast time-changing channel environment, thereby improving the system performance.

In the embodiments of the present invention, an LTE-TDD downlink multiple input multiple output orthogonal frequency division multiplexing (MIMO-OFDMA, Multiple Input Multiple Output Orthogonal Frequency Division Multiplexing) radio communication system is mainly used as an example to propose a high-precision channel estimation solution that is applicable to fast time-changing channels based on characteristics of LTE-TDD downlink channels in a high-speed environment such as high-speed railway. Aspects of improving the channel estimation precision on pilot and/or improving the interpolation precision between pilot symbols are mainly considered in a research for how to improve the channel estimation precision for fast time-changing channels.

To help better analyze the channel estimation solution in the MIMO-OFDMA system, the following first introduces the signal transmission model and channel estimation resources in the MIMO-OFDMA system.

Signal Transmission Model in the MIMO-OFDMA System

Figure 1:
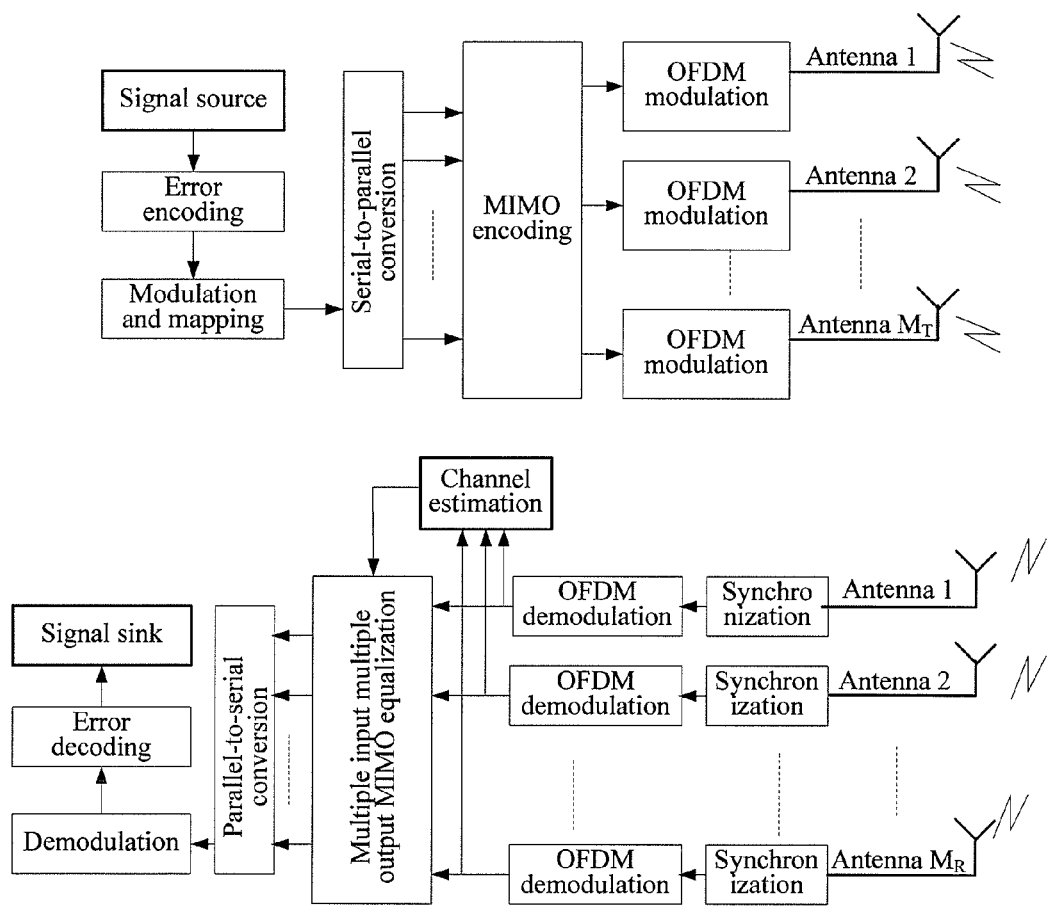
FIG. 1 is a schematic diagram of a model of a MIMO-OFDMA system according to an embodiment of the present invention.

Referring to FIG. 1, the following takes a MIMO-OFDMA system model that has $M_T$ transmitting antennas and $M_R$ receiving antennas as an example for description.

Bit streams output by a signal source are modulated and mapped after error control encoding. The modulated and mapped complex data is output to a multiple input multiple output (MIMO, Multiple Input Multiple Output) encoder for encoding after serial-to-parallel conversion. The encoded data is divided into $M_T$ vectors whose length is N. Each vector whose length is N undergoes orthogonal frequency division multiplexing modulation in an orthogonal frequency division multiplexing (OFDM, Orthogonal Frequency Division Multiplexing) modulator. The modulated signal may be up-converted after being added with a cyclic prefix (CP, Cyclic Prefix), and then be transmitted by each transmitting antenna to radio channels.

A receiving end down-converts received signals of $M_R$ receiving antennas, performs synchronization estimation and compensation for them, and then removes their cyclic prefixes. Fast Fourier transform (FFT, Fast Fourier Transform) is separately performed for N received samples, pilot data in the transformed data is sent to a channel estimator, and each channel transmission coefficient output by the channel estimator and other data after FFT are transported to a MIMO equalizer for equalization. Sent bits are restored from the equalized data after processing such as parallel-to-serial conversion, OFDM demodulation, and error decoding, and finally sent to a signal sink.

MIMO-OFDMA System Model

For example, assume that complex data on the kth subcarrier of the uth OFDM symbol on the pth transmitting antenna is $S_p^{(u)}(k)$, where $$1 \le p \le M_T \text{ and } -\frac{N_{used}}{2} \le k \le \frac{N_{used}}{2} - 1.$$

After inverse fast Fourier transform (IFFT, Inverse Fast Fourier Transform) of the complex data, a corresponding time domain signal $s_p^{(u)}(n)$ may be expressed as follows:

$$s_p^{(u)}(n) = \frac{1}{\sqrt{N}} \sum_{k=-\frac{N_{used}}{2}}^{\frac{N_{used}}{2}-1} S_p^{(u)}(k) \exp(j2\pi kn/N) \quad (1)$$

In formula (1), $0 \le n \le N-1$, where N indicates the number of subcarriers in the OFDM symbol, that is, the length of Fourier transform and inverse transform. Sampling $s_p^{(u)}(n)$ in the time domain of N OFDM signals lasts time T. If the channel between the pth transmitting antenna and the qth receiving antenna is a multi-path Rician channel whose memory length is $L_{p,q}$, its shock response $h_{p,q}(t,\tau)$ may be expressed as follows:

$$h_{p,q}(t, \tau) = \begin{cases} C^{(p,q)}, & l = 0 \\ \sum_{l=0}^{L_{p,q}-1} \alpha^{(p,q)}{}_l(t) \cdot \delta(t - \tau_l) \end{cases} \quad (2)$$

$C^{(p,q)}$ in formula (2) is a Rician path coefficient between the pth transmitting antenna and the qth receiving antenna, the value of which is determined by a channel Rician factor $$\kappa = \frac{P}{\sum_l \sigma_l^2}$$

(where, P is the total power of the direct path and $$\sum_l \sigma_l^2$$

is the sum of powers of scattering paths). $\alpha^{(p,q)}{}_l(t)$ is a fading coefficient of the lth path between the pth transmitting antenna and the qth receiving antenna, which usually complies with Rayleigh distribution, and varies according to the maximum Doppler frequency shift $f_d$. $\tau_l$ indicates a channel delay of the lth path.

If the transmitting and receiving ends are fully synchronized, a signal $r_q(t)$ received by the qth receiving antenna is as follows:

$$r_q(t) = \sum_{p=1}^{M_T} \left( C^{(p,q)} s_p(t) + \sum_{l=0}^{L_{p,q}-1} \alpha^{(p,q)}l(t)s_p(t-\tau_l) \right) + w_q(t) \quad (3)$$

The receiving end samples the received signal. After CP removal and FFT, a signal $R_q^{(u)}(k)$ on the kth subcarrier of the uth OFDM symbol received by the qth receiving antenna is as follows:

$$R_q^{(u)}(k) = \sum_{p=1}^{M_T} H_{p,q}^{(u)}(k) S_p^{(u)}(k) + W_q^{(u)}(k) \quad (4)$$

In formula (4), $W_q^{(u)}(k)$ is a frequency domain expression of Gaussian white noise in the uth symbol period of the kth subcarrier on the qth antenna, having the same statistical characteristics as those of $W_q(t)$. $H_{p,q}^{(u)}(k)$ indicates a channel coefficient of the kth subcarrier in the uth symbol period from the transmitting antenna p to the receiving antenna q.

$$H_{p,q}^{(u)}(k) = \frac{1}{\sqrt{N}} \sum_{m=0}^{N-1} \left[ \frac{1}{N} \sum_{n=0}^{N-1} C^{(p,q)}(n) + \sum_{l=0}^{L-1} \frac{1}{N} \sum_{n=0}^{N-1} \alpha^{(p,q)}l(n) \right] e^{-j\frac{2\pi mk}{N}} \quad (5)$$

Channel estimation resources in the MIMO-OFDMA system

In the LTE-TDD downlink MIMO-OFDMA system, a reference symbol (pilot symbol) may be used for data channel estimation. If the basic resource unit for OFDM (that is, 1 subcarrier×1 OFDM symbol) is defined as a resource element (RE, Resource Element), downlink reference symbols use RE as the unit, that is, one reference symbol occupies only one RE. These reference symbols may be divided into two rows: first reference symbol and second reference symbol, where the first reference symbol is located at the first OFDM symbol of every 0.5 ms timeslot, and the second reference symbol is located at the last but two OFDM symbol of each timeslot.

In the frequency domain, one reference symbol is inserted into every six subcarriers. In addition, the first reference symbol and the second reference symbol are interlaced in the frequency domain.

Design of downlink reference symbols is orthogonal to a certain extent to effectively support multi-antenna transmission. Different MIMO antennas are multiplexed by using the FDM mode. The pilot structure of each antenna may be consistent with that of a single antenna, but the pilot frequencies of two antenna ports are interlaced.

Figure 2:
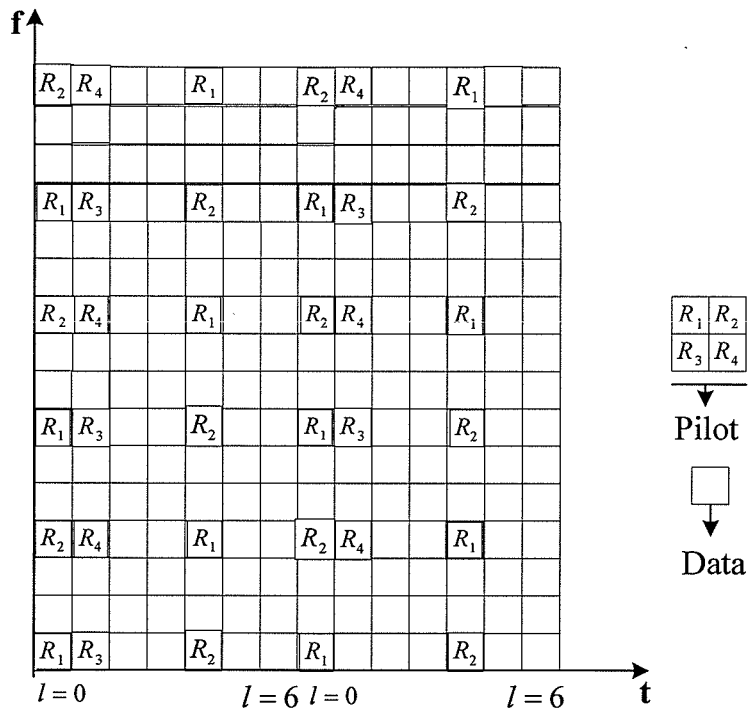
FIG. 2 is a schematic diagram of a pilot structure where an LTE-TDD downlink transmission link uses 4-antennas MIMO according to an embodiment of the present invention.

FIG. 2 shows a four-antenna MIMO pilot structure used by an LTE-TDD downlink transmission link in the case of regular CP. In FIG. 2, $R_1$ is the position where antenna 1 sends a pilot signal, $R_2$ is the position where antenna 2 sends a pilot signal, $R_3$ is the position where antenna 3 sends a pilot signal, $R_4$ is the position where antenna 4 sends a pilot signal, and the rest is deduced through analogy. The blank position is the position where a data signal is sent. When a signal is actually sent, each antenna sends only its corresponding pilot signal, but does not send any effective signals at positions where other antennas send pilot signals, thereby avoiding interference generated to the pilot frequencies of other antennas.

Detailed description is provided below with specific embodiments.

Figure 3:
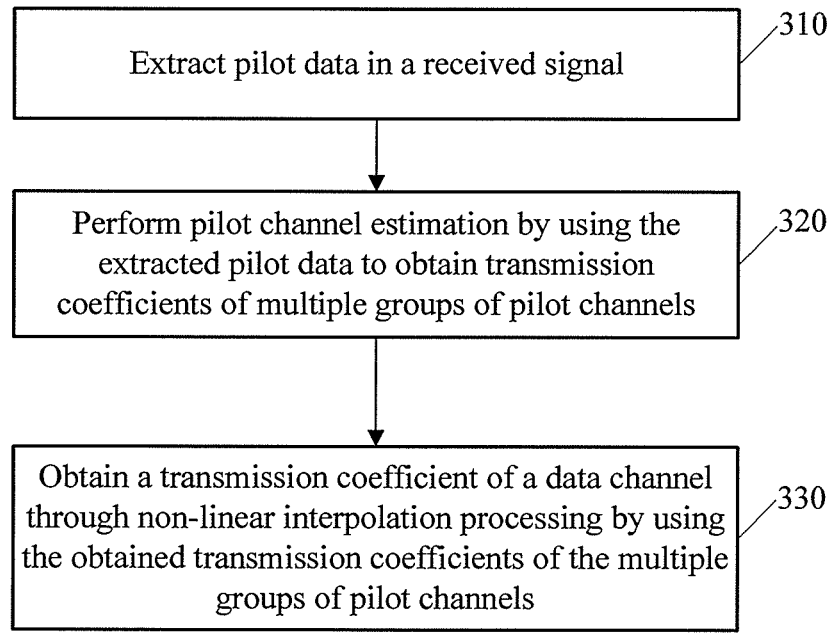
FIG. 3 is a schematic flow chart of a channel estimation method according to an embodiment of the present invention.

Referring to FIG. 3, a channel estimation method provided in an embodiment of the present invention may include:

310: Extract pilot data in a received signal.

320: Perform pilot channel estimation by using the extracted pilot data to obtain transmission coefficients of multiple groups of pilot channels.

In actual applications, for example, the least square (LS, Least Square) algorithm, minimum mean-squared error (MMSE, Minimum Mean-squared Error) algorithm, blind estimation algorithm, maximum likelihood (ML, Maximum Likelihood) algorithm, or other channel estimation algorithms may be used for pilot channel estimation of the extracted pilot data to obtain channel transmission coefficients of multiple groups of pilot channels (that is, channels corresponding to pilot subcarriers), that is, obtain transmission coefficients of pilot channels on all OFDM that carry pilot frequencies.

330: Obtain a transmission coefficient of a data channel through non-linear interpolation processing by using the obtained transmission coefficients of the multiple groups of pilot channels.

As such, according to this embodiment, the pilot data extracted from the received signal is used for pilot channel estimation to obtain transmission coefficients of multiple groups of pilot channels, and then the obtained transmission coefficients of the multiple groups of pilot channels are used to obtain the transmission coefficient of the data channel through non-linear interpolation processing. Acquiring the transmission coefficient of the data channel based on the non-linear interpolation processing mechanism helps improve the channel estimation precision in a fast time-changing channel environment and thereby helps improve the system performance.

In an application scenario, noise reduction processing may be further performed for the obtained transmission coefficients of the multiple groups of pilot channels; the obtained transmission coefficients of the multiple groups of pilot channels that have undergone noise reduction processing may be used to obtain a transmission coefficient of a data channel through non-linear interpolation processing.

In actual applications, the method for performing noise reduction processing for the obtained transmission coefficients of the multiple groups of pilot channels may include: separately performing sum and average noise reduction processing for the transmission coefficients of the pilot channels on each obtained OFDM symbol to obtain the corresponding transmission coefficient of the pilot channel that has undergone noise reduction processing on each OFDM symbol that carries a pilot frequency; or, using the obtained transmission coefficients of the pilot channels to obtain the transmission coefficients of the data channels on the OFDM symbols that carry pilot frequencies; performing sum and average noise reduction processing for the channel transmission coefficients of the OFDM symbols that carry pilot frequencies in the unit of M-resource blocks to obtain the corresponding transmission coefficient of the pilot channel that has undergone noise reduction processing on each OFDM symbol that carries a pilot frequency. Or, the obtained transmission coefficients of the multiple groups of pilot channels may further be sorted according to time-frequency correlation (time domain and/or frequency domain); the sorted transmission coefficients of the multiple groups of pilot channels are transformed to a transform domain; transform domain noise reduction processing is performed for the transmission coefficients of the multiple groups of pilot channels transformed to the transform domain; the transmission coefficients of the multiple groups of pilot channels after transform domain noise reduction processing are transformed to a frequency domain to obtain the transmission coefficients of the multiple groups of pilot channels that have undergone noise reduction processing in the corresponding frequency domain.

The sorting the obtained transmission coefficients of the pilot channels according to time-frequency correlation may specifically include: sorting the obtained transmission coefficients of the multiple groups of pilot channels according to time domain correlation values before sorting them according to frequency domain correlation values; or, sorting the obtained transmission coefficients of the multiple groups of pilot channels according to frequency domain correlation values before sorting them according to time domain correlation values. The performing transform domain noise reduction processing for the transmission coefficients of the multiple groups of pilot channels transformed to the transform domain may specifically include: performing transform domain noise reduction processing for the transmission coefficients of the multiple groups of pilot channels transformed to the transform domain by using a filter noise reduction or threshold noise reduction mode.

Certainly, other methods may also be used to perform noise reduction processing for the obtained transmission coefficients of the multiple groups of pilot channels, but the present invention is not limited to the preceding examples.

In an application scenario, the obtained transmission coefficients of the pilot channels may be used to obtain a transmission coefficient of a data channel closest to a pilot symbol through linear interpolation; the obtained transmission coefficient of the data channel is used to obtain transmission coefficients of other data channels closest to the data channel through linear interpolation. The process may be repeated where the obtained transmission coefficients of the data channels adjacent to the data channels whose transmission coefficients have not been obtained are used to obtain through linear interpolation the transmission coefficients of the data channels whose transmission coefficients have not been obtained, until transmission coefficients of data channels in all OFDM symbols that do not carry pilot frequencies between two OFDM symbols that carry pilot frequencies are obtained.

In another application scenario, the obtained transmission coefficients of the pilot channels may be used to obtain a transmission coefficient of a data channel closest to a pilot symbol through linear interpolation; the transmission coefficient of the data channel is used to perform equalization and hard decision for a corresponding received frequency domain signal on the data channel; hard decision data obtained through hard decision and the corresponding received frequency domain signal on the data channel are used for channel estimation to obtain a transmission coefficient with elevated precision on the data channel; the transmission coefficient with elevated precision on the data channel is used to obtain transmission coefficients of other data channels closest to the data channel through linear interpolation. Further, if transmission coefficients of other data channels have not been obtained, the process may be repeated. The transmission coefficients with elevated precision on the data channels adjacent to the data channels whose transmission coefficients have not been obtained are used to obtain through linear interpolation the transmission coefficients of the data channels whose transmission coefficients have not been obtained, until transmission coefficients of data channels in all OFDM symbols that do not carry pilot frequencies between two OFDM symbols that carry pilot frequencies are obtained.

According to another embodiment, a channel estimation method provided in the embodiments of the present invention may include: extracting pilot data in a received signal; performing pilot channel estimation by using the extracted pilot data to obtain transmission coefficients of multiple groups of pilot channels; performing noise reduction processing for the obtained transmission coefficients of the multiple groups of pilot channels; and obtaining a transmission coefficient of a data channel through linear or non-linear interpolation processing by using the obtained transmission coefficients of the multiple groups of pilot channels that have undergone noise reduction processing.

For the method of noise reduction processing for the obtained transmission coefficients of the multiple groups of pilot channels and the step of "sorting the obtained transmission coefficients of the pilot channels according to time-frequency correlation" involved in the noise reduction process, reference may be made to the description in the preceding embodiment, and the details are not described herein again.

As such, according to this embodiment, the pilot data extracted from the received signal is used for pilot channel estimation to obtain transmission coefficients of multiple groups of pilot channels followed by noise reduction processing, and then the obtained transmission coefficients of the multiple groups of pilot channels that have undergone noise reduction processing are used to obtain the transmission coefficient of the data channel through linear or non-linear interpolation processing. Acquiring the transmission coefficient of the data channel through interpolation processing by using the transmission coefficients of pilot channels that have undergone noise reduction processing helps improve the channel estimation precision in a fast time-changing channel environment and thereby helps improve the system performance.

To help better understand the solutions in the embodiments of the present invention, according to another embodiment of the channel estimation method in the present invention, in a MIMO-OFDMA system, a transmission coefficient of each group of pilot subcarriers estimated by using an LS algorithm is used as a basis, noise reduction processing is performed for the estimated channel transmission coefficients of the pilot subcarriers, then different processing is performed for the high-precision channel response of pilot subcarriers after processing to obtain channel transmission coefficients of data subcarriers on OFDM symbols that carry pilot frequencies, and non-linear interpolation processing is performed by using the obtained high-precision channel transmission coefficients of data subcarriers on OFDM symbols that carry pilot frequencies to obtain channel response on OFDM symbols that do not carry pilot frequencies. The following introduces the specific implementation mode by combining theoretical inference.

In the LTE-TDD downlink MIMO-OFDMA system, channel estimation is performed for sub-channels between each pair of transmitting antenna and receiving antenna, which may be similar to a channel estimation scenario in a single input single output orthogonal frequency division multiplexing (SISO-OFDMA, Single Input Single Output-OFDMA) system. Therefore, to facilitate illustration, this embodiment mainly takes the SISO-OFDMA system for example for description. A resource block according to standard definition occupies $N_{res}$=12 subcarriers in the frequency domain.

This embodiment mainly includes two aspects: in one aspect, a method for improving the channel estimation precision for a pilot channel (that is, a channel corresponding to a pilot subcarrier) is introduced; in another aspect, a method for improving the channel interpolation precision between pilot symbols is introduced.

(1) Method for Improving the Estimation Precision of a Channel Transmission Coefficient of a Pilot Subcarrier According to this Embodiment For the LTE-TDD downlink transmission SISO-OFDMA system, pilot symbols may be used to estimate sub-channels between transmitting and receiving antennas. However, the estimation precision for the channel transmission coefficients of pilot subcarriers obtained by using the conventional LS algorithm is not high. As such, this embodiment provides a method for improving channel response on a pilot subcarrier, which may be called channel estimation noise reduction method herein.

The following mainly introduces two channel estimation noise reduction methods: including a sum and average channel estimation noise reduction method and a channel estimation noise reduction method that combines time and frequency domains, which are used to improve the estimation precision of the channel transmission coefficients of pilot subcarriers.

A. This embodiment provides a sum and average channel estimation noise reduction method, mainly including:

measuring the variance or root-mean squared delay spread of the pilot channel transmission coefficient obtained through estimation to judge intensity of channel frequency selectivity, and selecting a corresponding channel estimation noise reduction method according to the intensity of the channel frequency selectivity.

In an application scenario, if the channel frequency selectivity is weak, the sum and average pilot channel noise reduction method may be selected;

If the channel frequency selectivity is moderate, the sum and average M-resource block noise reduction method may be used;

If the channel frequency selectivity is strong (for example, when a train is approaching a station at a low speed), the conventional channel estimation method may be used.

Figure 4:
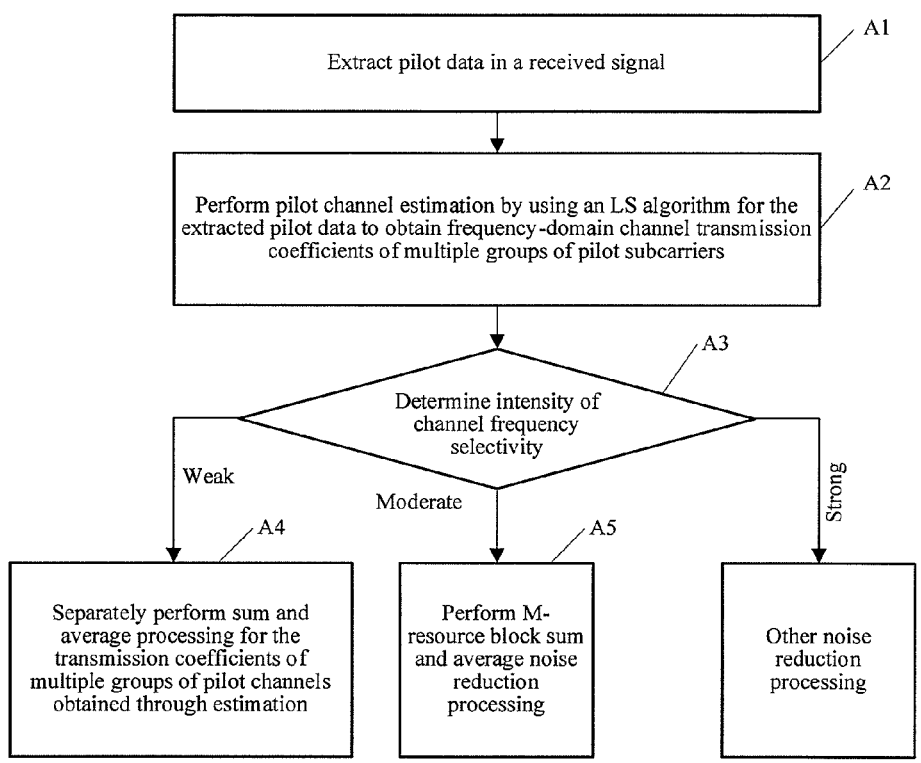
FIG. 4 is a schematic flow chart of a channel estimation noise reduction method through sum and average according to an embodiment of the present invention.

Referring to FIG. 4, the specific steps of a sum and average channel estimation noise reduction method provided in this embodiment may include:

A1: Extract pilot data in a received signal.

A2: Perform pilot channel estimation by using an LS algorithm for the extracted pilot data to obtain frequency-domain channel transmission coefficients $\hat{H}_{P_{sym}}(k_P)$ on multiple groups of pilot subcarriers.

$$\hat{H}_{P_{sym}}(k_p) = \frac{Y_{P_{sym}}(k_p)}{S_{P_{sym}}(k_p)} \quad (6)$$

$$= H_{P_{sym}}(k_p) + W_{P_{sym}}(k_p),$$

$$k_p \in \text{index\_pilot}, \, p_{sym} = 1, 5, 8, 12$$

In formula (6), $H_{P_{sym}}(k_p)$ indicates the real value of the channel transmission coefficient of pilot subcarrier No. $k_p$ on the $P_{sym}$th OFDM symbol that carries a pilot frequency, $W_{P_{sym}}(k_p)$ indicates a noise component of channel estimation, and index_pilot indicates a collection of position numbers of the pilot subcarriers.

Formula (6) may be expressed in a vector form as follows:

$$\hat{H}_{P_{sym}} = H_{P_{sym}} + W_{P_{sym}} \quad (7)$$

In formula (7):

$$\hat{H}_{P_{sym}} = [\hat{H}_{P_{sym}}(k_1), \ldots, \hat{H}_{P_{sym}}(k_{N_p})]^T;$$

$$H_{P_{sym}} = [H_{P_{sym}}(k_1), \ldots, H_{P_{sym}}(k_{N_p})]^T;$$

$$W_{P_{sym}} = [W_{P_{sym}}(k_1), \ldots, W_{P_{sym}}(k_{N_p})]^T;$$

where $k_p \in$ index_pilot and $p_{sym} = 1, 5, 8, 12$.

It may be understood that, step A2 takes the channel transmission coefficients of the multiple groups of pilot subcarriers obtained through the LS estimation algorithm as an example for description. In actual applications, certainly, the MMSE algorithm, blind estimation algorithm, ML algorithm, or other channel estimation algorithms may also be used to obtain channel transmission coefficients of multiple groups of pilot subcarriers through estimation.

A3: Determine intensity of channel frequency selectivity.

For the frequency selectivity characteristics of high-speed movement channels such as high-speed railway, this embodiment uses the variance of each sub-channel coefficient in OFDM to define three levels of channel frequency selectivity. The first level indicates weak frequency selectivity, the second level indicates moderate frequency selectivity, and the third level indicates strong frequency selectivity.

To facilitate judgment, two judgment thresholds threshold$_1$ and threshold$_2$ may be preset. The specific judgment threshold values are determined by the noise in the channel and interference introduced by the noise reduction method.

The judgment method for channel frequency selectivity may be as follows:

The transmission coefficient of one group of pilot sub-channels among the transmission coefficients of the multiple groups of pilot sub-channels obtained through estimation in step A2 is selected, and its variance value $\sigma^2$ is calculated; two thresholds threshold$_1$ and threshold$_2$ are set according to the variance value $\sigma^2$.

If the variance value meets $\sigma^2 <$threshold$_1$, the channel is determined as a channel with weak frequency selectivity. If the channel is determined as a channel with weak frequency selectivity, go to step A4.

If the variance value meets threshold$_1 \leq \sigma^2 \leq$threshold$_2$, the channel is determined as a channel with moderate frequency selectivity. If the channel is determined as a channel with moderate frequency selectivity, go to step A5.

If the variance value meets $\sigma^2 >$threshold$_2$, the channel is determined as a channel with strong frequency selectivity, which generally corresponds to a case where the movement speed is low (for example, when a high-speed train approaches a station). If the channel is determined as a channel with strong frequency selectivity, regular noise reduction processing (for example, noise reduction processing by changing the domain name) may be performed, or no noise reduction processing is performed.

It may be understood that in a high-speed movement (for example, when a high-speed train does not approach a station) communication environment, the frequency selectivity of a channel is generally not strong, that is, the frequency selectivity is between moderate and weak.

Furthermore, in addition to judgment by using the variance of each channel transmission coefficient, the intensity of channel frequency selectivity may further be judged by calculating the channel root mean-squared delay spread, or the intensity of channel frequency selectivity may be judged by using other methods.

A4: If the frequency selectivity of the channel is weak or the channel is a time selective fading channel, as the channel within one OFDM symbol in the frequency domain changes slowly, the following may be regarded:

$$H_{P_{sym}}(i) \approx H_{P_{sym}}(j) \approx H_{P_{sym}}, i \neq j$$

Therefore, for this type of channel, separate sum and average processing may be performed for the transmission coefficients $\hat{H}_{P_{sym}}(k_p)$, $k_p \in \text{index\_pilot}$, $p_{sym}=1, 5, 8, 12$ of the multiple groups of pilot channels obtained through estimation according to this embodiment as follows:

$$\tilde{H}_{P_{sym},M}(k') = \overline{H}_{P_{sym},M} \qquad (8)$$

$$= H_{P_{sym},M} + \frac{1}{M \cdot N_{res}} \sum_{k''=k_1}^{k_1 + M \cdot N_{res}} W_{P_{sym}}(k'')$$

After processing by using the method in formula (8), the noise component in the channel transmission coefficient of a pilot subcarrier may be lowered to $1/N_p$ of the original one, thereby improving the estimation precision of the channel transmission coefficient of the pilot subcarrier. Then the obtained multiple groups of channel transmission coefficients after noise reduction may further separately serve as the channel transmission coefficients of all effective subcarriers on their corresponding OFDM symbols.

The channel transmission coefficients of pilot subcarriers after noise reduction are as follows:

$$\check{H}_{P_{sym}}(k) = \overline{H}_{P_{sym}} \qquad (9)$$

$$= H_{P_{sym}} + \frac{1}{N_p} \sum_{k_p=1}^{N_p} W_{P_{sym}}(k_p),$$

$$k = 1, 2, \ldots, N_p, p_{sym} \in [1, 5, 8, 12]$$

Formula (9) may be expressed in a vector form as follows:

$$\check{H}_{P_{sym}} = H_{P_{sym}} + \check{W}_{P_{sym}}, p_{sym} \in [1,5,8,12] \qquad (10)$$

In formula (10):

$$\check{H}_{P_{sym}} = \left[ \check{H}_{P_{sym}}(1), \ldots, \check{H}_{P_{sym}}(N_p) \right]^T$$

$$H_{P_{sym}} = \underbrace{\left[ H_{P_{sym}}, H_{P_{sym}}, \ldots, H_{P_{sym}} \right]^T}_{N_p}$$

$$\overline{W}_{P_{sym}} = \underbrace{\frac{1}{N_p} \left[ \sum_{k_p=1}^{N_p} W_{P_{sym}}(k_p), \ldots, \sum_{k_p=1}^{N_p} W_{P_{sym}}(k_p) \right]^T}_{N_p}$$

Then the MSE of the channel estimation error after noise reduction is as follows:

$$MSE = E\left\{ \left\| \check{H}_{P_{sym}} - H_{P_{sym}} \right\|^2 \right\} \qquad (11)$$

$$= E\left\{ \left\| \check{W}_{P_{sym}} \right\|^2 \right\}$$

$$= \frac{1}{N_p} \sum_{k_p=1}^{N_p} E\left\{ \left| \overline{W}_{P_{sym}}(k_p) \right|^2 \right\}$$

$$= \frac{N_p}{N_p} \sigma_w^2$$

$$= \sigma_w^2$$

It may be found that after the sum and average noise reduction processing in step A4, the estimation error for a pilot channel can be greatly reduced.

A5: If the frequency selectivity of the channel is moderate, it may be regarded that the channel fading on each subcarrier in the frequency domain may vary, and a deep fading phenomenon may even occur on certain carriers.

For such a channel, this embodiment proposes M-resource block sum and average noise reduction processing.

The M-resource block sum and average noise reduction processing includes:

a51: Obtain the channel transmission coefficients $\hat{H}_{P_{sym}}(k)$ of all effective subcarriers on the $P_{sym}$th OFDM symbol by using the transmission coefficients of the multiple groups of pilot channels obtained in step A2, where $$\hat{H}_{P_{sym}}(k) = \begin{cases} \hat{H}_{P_{sym}}(k_d), k \notin \text{index\_pilot} \\ \hat{H}_{P_{sym}}(k_p), k \in \text{index\_pilot} \end{cases} \qquad (12)$$

$$\hat{H}_{P_{sym}}(k_d) = \left(1 - \frac{m}{N_p}\right) \hat{H}_{P_{sym}}(k_p) + \frac{m}{N_p} \hat{H}_{P_{sym}}(k_p + 1) \qquad (13)$$

In formula (13), $k_p N_p < k_d < (k_p+1)N_p$ is an index of a data position in the frequency domain direction, where $k_p \in \text{index\_pilot}$ and $k_d \neq k_p$; $N_p$ indicates the number of pilot subcarriers on each OFDM symbol, and $P_{sym}$ indicates an index of an OFDM symbol that carries a pilot frequency, for example, $P_{sym}=1, 5, 8, 12$; m is a relative index of the data position, where $0 \leq m \leq N_p$.

The channel transmission coefficients $\hat{H}_{P_{sym}}(k)$ of all effective subcarriers on the $P_{sym}$th OFDM symbol may be obtained by using formula (6) and formula (13).

a52: Obtain detection data $\hat{X}_{P_{sym}}(k)$ through a zero forced (ZF, Zero Forced) equalization algorithm by using the $P_{sym}$th received frequency-domain OFDM symbol $Y_{P_{sym}}(k)$.

$$\hat{X}_{P_{sym}}(k) = \frac{Y_{P_{sym}}(k)}{\hat{H}_{P_{sym}}(k)} \qquad (14)$$

In formula (14), $$-\frac{N_{used}}{2} \leq k \leq \frac{N_{used}}{2} - 1.$$

a53: Perform hard decision processing for the obtained $P_{sym}$th detection data symbol to obtain a hard decision signal $\tilde{X}_{P_{sym}}(k)$ where $$-\frac{N_{used}}{2} \leq k \leq \frac{N_{used}}{2} - 1;$$

and then obtain the channel transmission coefficient $\tilde{H}_{P_{sym}}(k)$ on the symbol through an LS algorithm (or other estimation algorithms) by using the $P_{sym}$th received frequency-domain OFDM symbol $Y_{P_{sym}}(k)$ and $\tilde{X}_{P_{sym}}(k)$.

$$\tilde{H}_{P_{sym}}(k) = \frac{Y_{P_{sym}}(k)}{\tilde{X}_{P_{sym}}(k)} \qquad (15)$$

$$= H_{P_{sym}}(k) + W_{P_{sym}}(k),$$

$$-\frac{N_{used}}{2} \leq k \leq \frac{N_{used}}{2} - 1$$

In formula (15), $H_{Psym}(k)$ is a true channel on the kth subcarrier, and $W_{Psym}(k)$ indicates an additive white Gaussian noise component. The estimation precision of $\tilde{H}_{P_{sym}}(k)$ depends on the probability of a hard decision error.

Practices show that, for modulation of low orders in quadrature phase shift keying (QPSK, Quadrature Phase Shift Keying) or 16 quadrature amplitude modulation (16QAM, 16 Quadrature Amplitude Modulation), the probability of a decision error may be neglected. Therefore, the estimation precision of channel transmission coefficients obtained by using formula (15) is high.

Further, in step a53, the data $\tilde{X}_{P_{sym}}(k)$ obtained through hard decision may be demodulated, mapped, de-interleaved, and decoded and then encoded, interleaved, modulated, and mapped. The restored data is used as hard decision data to calculate the channel transmission coefficient $\tilde{H}_{P_{sym}}(k)$, thereby reducing the bit error rate of data and further improving the performance of channel estimation.

a54: Divide the transmission coefficients of the $P_{sym}$th OFDM symbol in the unit of resource blocks, detect channel changes on the OFDM symbol, and put M $$\left(1 \leq M \leq \frac{N_{used}}{N_{res}}\right)$$

continuous resource blocks whose channels change slowly in a collection ($H_{P_{sym},M}(i) \approx H_{P_{sym},M}(j) \approx H_{P_{sym},M}$, $i \neq j$).

a55: Perform sum and average processing in the unit of M resource blocks, that is, perform sum and average for channel transmission coefficients of M resource blocks. Use this processing for every M continuous resource blocks.

For details, see formula (16).

$$\overline{H}_{P_{sym},M} = \frac{1}{M \cdot N_{res}} \sum_{k'=k_1}^{k_1+M \cdot N_{res}} \tilde{H}_{P_{sym}}(k) \qquad (16)$$

$$= \frac{1}{M \cdot N_{res}} \sum_{k'=k_1}^{k_1+M \cdot N_{res}} H_{P_{sym}}(k) +$$

$$\frac{1}{M \cdot N_{res}} \sum_{k'=k_1}^{k_1+M \cdot N_{res}} W_{P_{sym}}(k)$$

$$= H_{P_{sym},M} + \frac{1}{M \cdot N_{res}} \sum_{k=k_1}^{k_1+M \cdot N_{res}} W_{P_{sym}}(k),$$

$$p_{sym} \in [1, 5, 8, 12]$$

In formula (16), $$1 \leq M \leq \frac{N_{used}}{N_{res}},$$

and $k_1$ indicates the number of the start subcarrier of a resource block. Through processing by using the preceding formula, the noise interference component of the channel transmission coefficients of the subcarriers in the M resource blocks is reduced to $$\frac{1}{(M \cdot N_{res})}$$

of the original one, improving the estimation precision of the channel transmission coefficients of the subcarriers in the M resource blocks.

a56: Use $\overline{H}_{P_{sym},M}$ ($p_{sym} \in [1, 5, 8, 12]$) obtained in step a55 as the channel transmission coefficients of all subcarriers in M resource blocks of the $P_{sym}$th symbol.

$$\tilde{H}_{P_{sym},M}(k') = \overline{H}_{P_{sym},M} \qquad (17)$$

$$= H_{P_{sym},M} + \frac{1}{M \cdot N_{res}} \sum_{k''=k_1}^{k_1+M \cdot N_{res}} W_{P_{sym}}(k'')$$

In formula (17), $(M-1) \cdot N_{res}+1 \leq k' \leq M \cdot N_{res}$, $p_{sym} \in [1, 5, 8, 12]$, and $$1 \leq M \leq \frac{N_{used}}{N_{res}}.$$

If one resource block has two pilot subcarriers, the channel coefficients of the pilot frequencies after noise reduction obtained through processing by formula (17) may be expressed as follows:

$$\check{H}_{P_{sym}}(k_p) = \dot{H}_{P_{sym}}(k_p) + \frac{1}{M \cdot N_{res}} \dot{W}_{P_{sym}}(k_p) \qquad (18)$$

In formula (18):

$$k_p = 1, 2, \ldots, N_p$$

$$\dot{H}_{P_{sym}}(k_p) \in \left[H_{P_{sym},1}, H_{P_{sym},1}, \ldots, H_{P_{sym},\frac{N_{used}}{M \cdot N_{res}}}, H_{P_{sym},\frac{N_{used}}{M \cdot N_{res}}}\right]$$

$$\dot{W}_{P_{sym}}(k_p) \in \begin{bmatrix} \sum_{k''=k_1}^{k_1+M \cdot N_{res}} W_{P_{sym}}(k''), \sum_{k''=k_1}^{k_1+M \cdot N_{res}} W_{P_{sym}}(k''), \ldots, \\ \sum_{k''=N_{used}-M \cdot N_{res}+1}^{N_{used}} W_{P_{sym}}(k''), \sum_{k''=N_{used}-M \cdot N_{res}+1}^{N_{used}} W_{P_{sym}}(k'') \end{bmatrix}$$

Formula (18) may be expressed in a vector form as follows:

$$\check{H}_{P_{sym}} = \dot{H}_{P_{sym}} + \frac{1}{M \cdot N_{res}} \dot{W}_{P_{sym}} \qquad (19)$$

In formula (19):

$$\check{H}_{P_{sym}} = [\check{H}_{P_{sym}}(1), \ldots, \check{H}_{P_{sym}}(N_p)]$$

$$\dot{H}_{P_{sym}} = [\dot{H}_{P_{sym}}(1), \ldots, \dot{H}_{P_{sym}}(N_pP]$$

$$\dot{W}_{P_{sym}} = [\dot{W}_{P_{sym}}(1), \ldots, \dot{W}_{P_{sym}}(N_p)]$$

Then the MSE of the channel estimation error after noise reduction is as follows:

$$\begin{aligned}
MSE &= E\left\{\left\|\check{H}_{P_{sym}} - \dot{H}_{P_{sym}}\right\|^2\right\} \\
&= E\{\|\dot{W}_{P_{sym}}\|^2\} \\
&= \frac{1}{M \cdot N_{res}} \sum_{k'_p=1}^{N_p} E\{|\dot{W}_{P_{sym}}(k'_p)|^2\} \\
&= \frac{N_p}{M \cdot N_{res}} \sigma_w^2
\end{aligned} \qquad (20)$$

It may be found that after the M-resource block sum and average noise reduction processing, the estimation error for a pilot channel may be greatly reduced.

B. This embodiment proposes a channel estimation noise reduction method that combines time and frequency domains.

The noise reduction method that combines time and frequency domains may be applied to a scenario where the channel frequency selectivity is strong (for example, when a train is approaching a station), and certainly may also be applied to other channel scenarios to improve the estimation precision of channel transmission coefficients of pilot subcarriers through channel estimation noise reduction processing that combines time and frequency domains.

Figure 5:
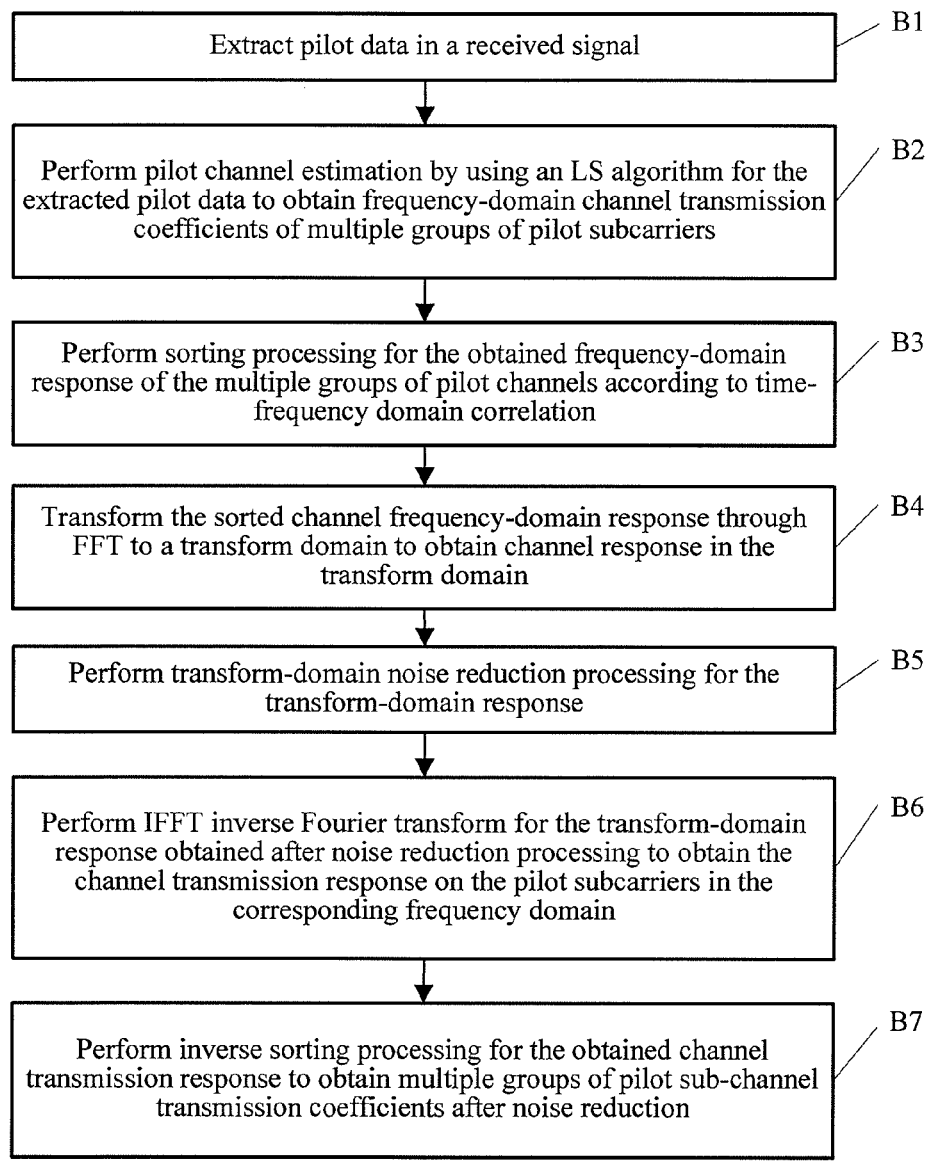
FIG. 5 is a schematic flow chart of another channel estimation noise reduction method through sum and average according to an embodiment of the present invention.

Referring to FIG. 5, the specific steps of a channel estimation noise reduction method that combines time and frequency domains provided in this embodiment may include:

B1: Extract pilot data in a received signal.

B2: Perform pilot channel estimation by using the pilot data to obtain frequency-domain channel transmission coefficients $\hat{H}_{P_{sym}}(k_p)$ on multiple groups of pilot subcarriers.

Similar to step A2, for example, the LS algorithm as shown in formula (6) may be used for pilot channel estimation to obtain channel transmission coefficients $\hat{H}_{P_{sym}}(k_P)$ on multiple groups of pilot subcarriers, that is, frequency-domain response of multiple groups of pilot channels, where $k_p \in$ index_pilot and $p_{sym} \in [1, 5, 8, 12]$.

It may be understood that, step B2 takes the channel transmission coefficients of the multiple groups of pilot subcarriers obtained through estimation by using the LS algorithm as an example for description. In actual applications, certainly, the MMSE algorithm, ML algorithm, blind estimation algorithm, or other channel estimation algorithms may also be used to obtain channel transmission coefficients of multiple groups of pilot subcarriers through estimation.

B3: Perform sorting processing for the obtained frequency-domain response of the multiple groups of pilot channels according to time-frequency domain correlation. The frequency-domain response of pilot channels after sorting is as follows:

$$\hat{H}_{p'}(k) = \begin{bmatrix} \hat{H}_1(1), \ldots, \hat{H}_1(N_p), \hat{H}_5(N_p), \ldots, \hat{H}_5(1), \\ \hat{H}_8(1), \ldots, \hat{H}_8(N_p), \hat{H}_{12}(N_p), \ldots, \hat{H}_{12}(1) \end{bmatrix}, \qquad (21)$$

$$k = 1, 2, \ldots, 4N_p$$

B4: Transform the sorted channel frequency-domain response $\hat{H}_p(k)(k=1, 2, \ldots, 4N_p)$ through FFT to a transform domain to obtain channel response $G_{N_p}(m)$ in the transform domain.

$$G_{N_p}(m) = \sum_{k=0}^{4N_p-1} \hat{H}_{p'}(k) e^{-j\frac{2\pi}{N_p}km}, m = 0, 2, \ldots, 4N_p - 1 \qquad (22)$$

Tests show that, most channel signal components in the transform domain are located near the low-frequency m=0 and m=$4N_p-1$, while the noise interference components are distributed in the entire frequency area (m=0, 1, ..., $4N_p-1$).

B5: Perform transform-domain noise reduction processing for the transform-domain response $G_{N_p}(m)$.

In an application scenario, according to the preceding distribution characteristics of channel signal components and noise interference components in the transform domain, a self-adaptive low-pass filter channel estimation noise reduction processing method may be used.

Here, a low-pass filter corresponding to self-adaptive low-pass filter noise reduction may be implemented by forcing the high-frequency component as zero and reserving the low-pass component, that is, $$\dot{G}_{N_p}(p_m) = \begin{cases} G_{N_p}(p_m), & 0 \le p_m \le p_c, 4N_p - p_c \le p_m \le 4N_p - 1 \\ 0, & \text{otherwise} \end{cases} \qquad (23)$$

In formula (23), $P_c$ is the cutoff frequency of the low-pass filter. After filtering, the noise component may be reduced to $$p_c / 2N_p$$

of the original one. The cutoff frequency of the low-pass filter may be set according to a proportion relationship between noise interference component and channel signal component in the effective signal-to-noise ratio $SNR_{eff}$ measured in real time.

In addition, the channel estimation noise reduction processing mode involving a self-adaptive threshold may also be used. In the channel estimation noise reduction processing mode involving a self-adaptive threshold, the self-adaptive threshold may also be determined through an effective signal-to-noise ratio measured in real time according to the magnitude of the effective signal-to-noise ratio, where the signals higher than the threshold are reserved as channel signals and components lower than the threshold are eliminated. The channel estimation noise reduction processing mode involving a self-adaptive threshold may also improve the estimation precision of channel transmission coefficients of pilot subcarriers by a large degree.

B6: Perform IFFT inverse Fourier transform for the transform-domain response $\dot{G}_{N_p}(p_m)$ obtained after noise reduction processing to obtain the channel transmission response $\dot{H}_{p'}(k)$ on the pilot subcarriers in the corresponding frequency domain.

$$\dot{H}_{p'}(k) = \sum_{p_m=0}^{4N_p-1} \dot{G}_{N_p}(p_m)e^{j\frac{2\pi}{4N_p}kp_m}, k = 0, 1, \ldots, 4N_p \quad (24)$$

B7: Perform inverse sorting processing for the obtained channel transmission response $\dot{H}_{p'}(k)$ to obtain multiple groups of pilot sub-channel transmission coefficients $\tilde{H}_p(k_p)$ after noise reduction, where $k_p \in$ index_pilot and $p_{sym} \in [1, 5, 8, 12]$.

Figure 6:
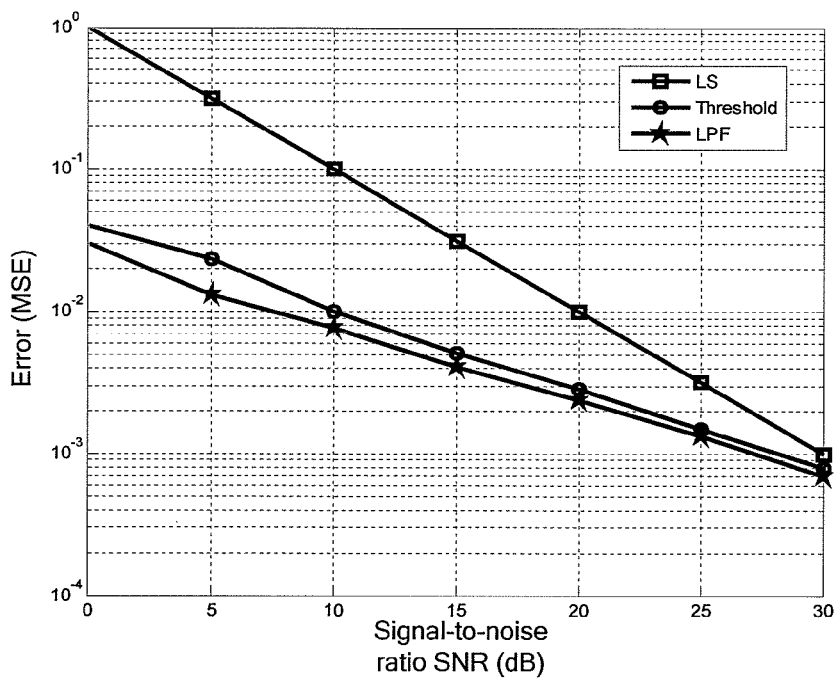
FIG. 6 is a schematic diagram of comparison of MSE performance between self-adaptive threshold noise reduction and self-adaptive low-pass filter noise reduction according to an embodiment of the present invention.

Referring to FIG. 6, FIG. 6 is a schematic diagram of comparison between MSE performance obtained by using self-adaptive threshold noise reduction and that obtained by using self-adaptive low-pass filter noise reduction on pilot channels obtained through simulation tests, where one path Rician channel k=9.

According to the specific implementation steps, channel transmission coefficients of pilot subcarriers output after channel estimation noise reduction may be obtained, that is, transmission coefficients of pilot channels after noise reduction processing may be obtained.

(2) Method for Improving Data Channel Interpolation Precision Between Pilot Symbols Provided in this Embodiment The following will study a method for improving data channel interpolation precision between pilot symbols. Here, assume that the channel transmission coefficients of pilot subcarriers are already known. The method for improving data channel interpolation precision between pilot symbols is studied on this basis. A study and practical tests on the existing constant interpolation, linear interpolation, Gaussian interpolation methods, and linear fitting method may show that none of the existing methods can obtain the optimal system performance in a high-speed movement (for example, high-speed railway) environment.

Figure 7:
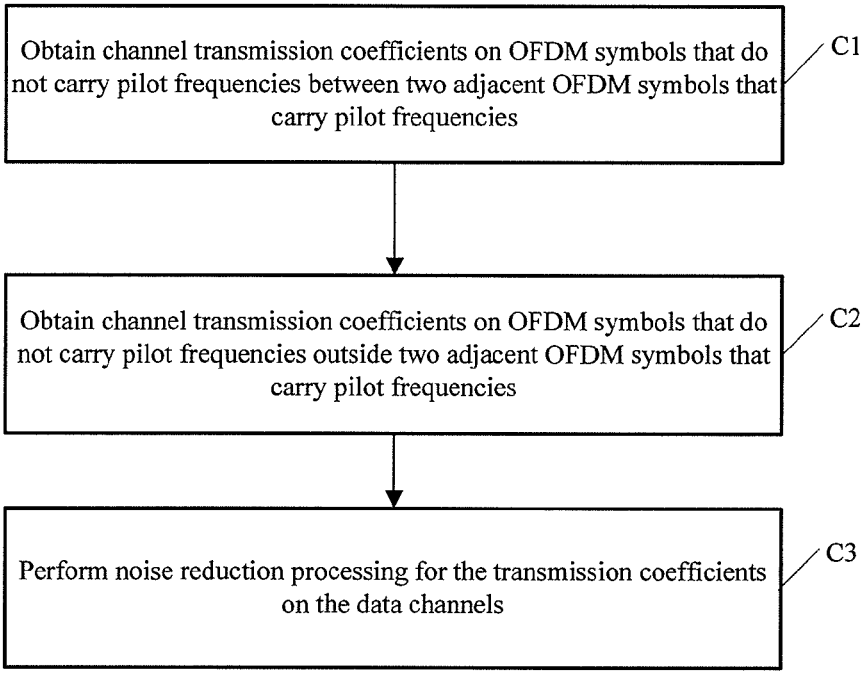
FIG. 7 is a schematic flow chart of a channel estimation noise reduction method by combining time and frequency domains according to an embodiment of the present invention.

Here, this embodiment proposes a method for improving channel interpolation between pilot symbols, that is, a non-linear interpolation method. Referring to FIG. 7, the implementation steps may include:

C1: Obtain channel transmission coefficients of OFDM symbols that do not carry pilot frequencies between two adjacent OFDM symbols that carry pilot frequencies, which may include:

c11: Use the obtained channel transmission coefficients $\hat{H}_{p_{sym}}(k_p)$ on pilot subcarriers to obtain channel transmission coefficients $\hat{H}_{p_{sym}}(k_d)$ on data subcarriers of OFDM symbols that carry pilot frequencies through, for example, the linear interpolation method in formula (13).

c12: Assume that the location numbers of two adjacent OFDM symbols that carry pilot frequencies in a same sub frame are separately i and j (i, j∈{$p_{sym}$}), and $L_D$($L_D$=j−i) OFDM symbols are located between the two OFDM symbols. Then the channel transmission coefficients of the (i+1)th and (j−1)th OFDM symbols that do not carry pilot frequencies obtained through a linear interpolation method may be expressed as follows:

$$\hat{H}_d(k) = \left(1 - \frac{m}{L_D}\right)\hat{H}_i(k) + \frac{m}{L_D}\hat{H}_j(k) \quad (25)$$

In formula (25), m=1, $L_D$−1, $$-\frac{N_{used}}{2} \le k \le \frac{N_{used}}{2} - 1,$$

and d=i+1,j−1.

c13: Obtain detection data $$\hat{X}_d(k) = \frac{Y_d(k)}{\hat{H}_d(k)}$$

through ZF equalization for the received frequency-domain signals $Y_d(k)$ and $\hat{H}_d(k)$ (d=i+1,j−1), and perform hard decision processing for it to obtain data $\hat{X}_d(k)$ after hard decision, where $$d = i+1, j-1 \text{ and } -\frac{N_{used}}{2} \le k \le \frac{N_{used}}{2} - 1.$$

c14: Use the received frequency-domain signal $Y_d(k)$ and hard decision data $\hat{X}_d(k)$ to obtain channel transmission coefficients of data symbols (data channels) with elevated precision through, for example, the LS algorithm as follows:

$$\tilde{H}_d(k) = \frac{Y_d(k)}{\hat{X}_d(k)} \quad (26)$$
$$= H_d(k) + W_d(k)$$

In formula (22), $$d = i+1, j-1 \text{ and } -\frac{N_{used}}{2} \le k \le \frac{N_{used}}{2} - 1,$$

where $H_d(k)$ indicates the true value of the channel transmission coefficient of the kth subcarrier on the dth symbol, and $W_d(k)$ indicates an additive white Gaussian noise component on the kth subcarrier on the dth symbol.

Certainly, in step c14, the MMSE algorithm or other channel estimation algorithms may also be used, and the received frequency-domain signal $Y_d(k)$ and hard decision data $\hat{X}_d(k)$ are used to obtain a high-precision channel transmission coefficient $\tilde{H}_d(k)$ on the data symbol.

Further, in steps c13 and c14, the hard decision data $\hat{X}_d(k)$ may be demodulated, mapped, de-interleaved, and decoded before being encoded, interleaved, modulated, and mapped. The restored data is used as hard decision data to calculate the channel transmission coefficient $\tilde{H}_d(k)$, thereby reducing the bit error rate of data and further improving the performance of channel estimation.

c15: Make i=i+1 and j=j+1, and return to step c12 to perform iterative operation, thereby obtaining the channel transmission coefficients of the (i+2)th and (j−2)th OFDM symbols with a high estimation precision.

Perform the preceding iterative operation until channel transmission coefficients of all OFDM symbols that do not carry pilot frequencies between two adjacent OFDM symbols that carry pilot frequencies are obtained.

C2: Obtain channel transmission coefficients of OFDM symbols that do not carry pilot frequencies outside two adjacent OFDM symbols that carry pilot frequencies, which may include:

c21: Assume that the number of the first OFDM symbol that does not carry a pilot frequency outside pilot symbols is i', where i'≠d. The constant interpolation method may be used to obtain the channel transmission coefficient $\hat{H}_{i'}(k)=\tilde{H}_{i'-1}(k)$ on the OFDM symbol, where i'≠d, $$-\frac{N_{used}}{2} \le k \le \frac{N_{used}}{2} - 1,$$

and $\tilde{H}_{i'-1}(k)$ is the channel transmission coefficient of the (i'−1)th OFDM symbol that carries a pilot frequency. Here, i'−1=12.

c22: Use the hard decision processing mechanism as shown in steps c13 and c14 of step C1 to perform hard decision processing for the obtained channel transmission coefficient $\hat{H}_{i'}(k)$ of the OFDM symbol that does not carry a pilot frequency, and use the hard decision data for channel estimation to obtain the channel transmission coefficient $\tilde{H}_{i'}(k)$ with a high estimation precision on the OFDM symbol.

c23: Make i'=i'+1, and return to step c21 for iterative operation until the channel transmission coefficient of the last OFDM symbol that does not include a pilot frequency is obtained through calculation.

C3: To further improve channel estimation precision on the data OFDM symbol, noise reduction processing may further be performed for it. For example, use the channel variance measurement or mean root-squared delay spread method to judge intensity of channel frequency selectivity, and perform channel estimation noise reduction processing for the obtained channel transmission coefficients of the OFDM symbols that do not carry pilot frequencies according to the intensity of channel frequency selectivity. Here, reference may be made to the sum and average noise reduction method, which is not described herein again.

In addition, if the channel frequency selectivity is moderate or strong, an iterative processing method may also be used to obtain the channel transmission coefficient $\hat{H}_{p_{sym}}(k_d)$ on a data subcarrier on an OFDM symbol that carries a pilot frequency, thereby minimizing the impact of deep fading that occurs on certain subcarriers generated by channel frequency selectivity upon channel estimation precision. The method for obtaining the channel transmission coefficient of a data subcarrier on an OFDM symbol that carries a pilot frequency through the iterative processing method is similar to the method for obtaining the channel transmission coefficient of an OFDM symbol that does not carry a pilot frequency through non-linear interpolation processing as shown in steps C1 to C3, and subcarriers are used here to replace OFDM symbols in steps C1 to C3. Through non-linear interpolation processing between frequency-domain subcarriers, the channel transmission coefficient with a high estimation precision on the OFDM symbol may be obtained, thereby overcoming the impact of a frequency selective channel upon channel estimation.

Figure 8:
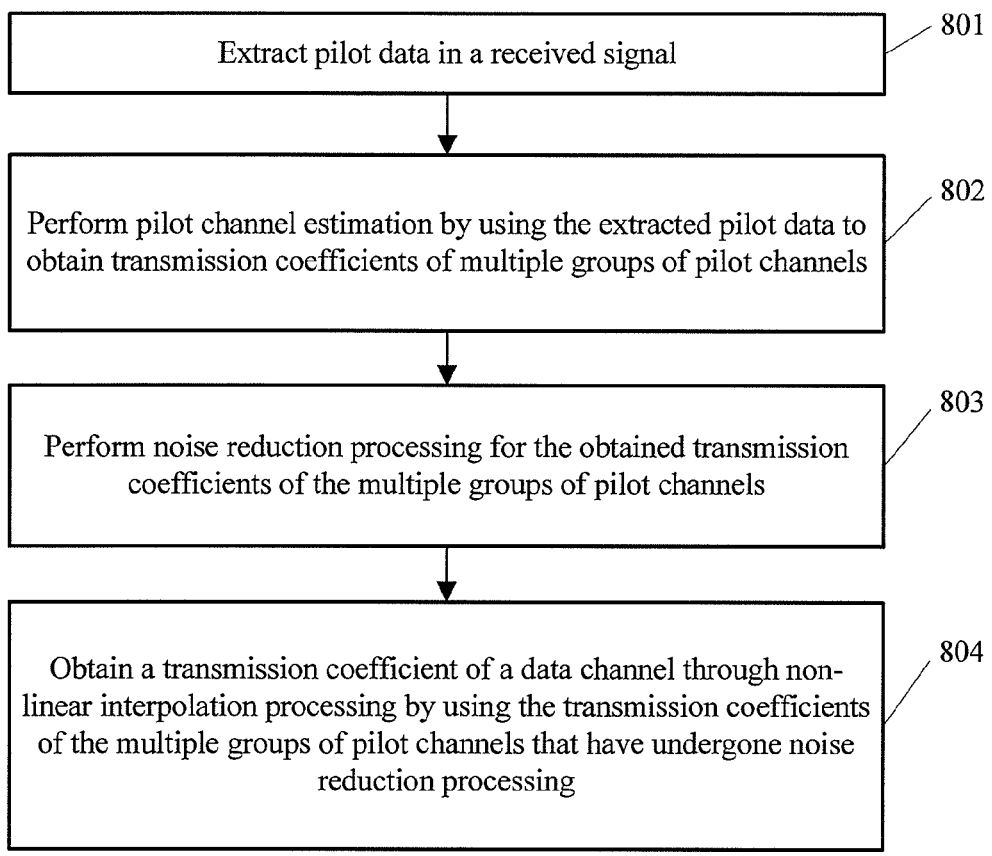
FIG. 8 is a schematic flow chart of another channel estimation method according to an embodiment of the present invention.

Based on the mechanism (1) of improving the estimation precision of channel transmission coefficient of a pilot subcarrier and the mechanism (2) of improving the data channel interpolation precision between pilot symbols, the following provides the implementation steps of the channel estimation method according to this embodiment. Referring to FIG. 8, according to another embodiment of the channel estimation method provided in the embodiments of the present invention, the following may be included:

801: Extract pilot data in a received signal.

802: Perform pilot channel estimation by using the extracted pilot data to obtain transmission coefficients of multiple groups of pilot channels.

In actual applications, for example, the least square (LS, Least Square) algorithm, minimum mean-squared error (MMSE, Minimum Mean-squared Error) algorithm, blind estimation algorithm, maximum likelihood (ML, Maximum Likelihood) algorithm, or other channel estimation algorithms may be used for pilot channel estimation of the extracted pilot data to obtain channel transmission coefficients of multiple groups of pilot channels (that is, pilot subcarriers).

803: Perform noise reduction processing for the obtained transmission coefficients of the multiple groups of pilot channels.

Each processing mechanism for improving the estimation precision of the channel transmission coefficient of a pilot subcarrier recorded in (1) may be used for noise reduction processing for the transmission coefficients of the multiple groups of pilot channels to obtain transmission coefficients with high precision on the pilot channels.

For example, in an application scenario, the performing noise reduction processing for the obtained transmission coefficients of the multiple groups of pilot channels may include: separately performing sum and average noise reduction processing for the transmission coefficients of the pilot channels on each obtained OFDM symbol to obtain the corresponding transmission coefficient of the pilot channel that has undergone noise reduction processing on each OFDM symbol that carries a pilot frequency; or, using the obtained transmission coefficients of the pilot channels to obtain the transmission coefficient of the data channel on the OFDM symbols that carry pilot frequencies; performing sum and average noise reduction processing for the channel transmission coefficients of the OFDM symbols that carry pilot frequencies in the unit of M-resource blocks to obtain the corresponding transmission coefficient of the pilot channel that has undergone noise reduction processing on each OFDM symbol that carries a pilot frequency.

In actual applications, the obtained transmission coefficients of the multiple groups of pilot channels may further be sorted according to time-frequency correlation; the sorted transmission coefficients of the multiple groups of pilot channels are transformed to a transform domain; transform domain noise reduction processing is performed for the transmission coefficients of the multiple groups of pilot channels transformed to the transform domain; the transmission coefficients of the multiple groups of pilot channels after transform domain noise reduction processing are transformed to a frequency domain to obtain the transmission coefficients of the multiple groups of pilot channels that have undergone noise reduction processing in the corresponding frequency domain.

The sorting the obtained transmission coefficients of the pilot channels according to time-frequency correlation may specifically include: sorting the obtained transmission coefficients of the multiple groups of pilot channels according to time domain correlation values before sorting them according to frequency domain correlation values; or, sorting the obtained transmission coefficients of multiple groups of pilot channels according to frequency domain correlation values before sorting them according to time domain correlation values.

The performing transform domain noise reduction processing for the transmission coefficients of the multiple groups of pilot channels transformed to the transform domain may specifically include: performing transform domain noise reduction processing for the transmission coefficients of the multiple groups of pilot channels transformed to the transform domain by using a filter noise reduction or threshold noise reduction mode.

804: Obtain a transmission coefficient of a data channel through non-linear interpolation processing by using the transmission coefficients of the multiple groups of pilot channels that have undergone noise reduction processing.

Each non-linear interpolation processing mechanism for improving the interpolation precision of data channels between pilot symbols recorded in (2) may be used to obtain transmission coefficients with high precision on data channels through non-linear interpolation processing by using the transmission coefficients of the multiple groups of pilot channels after noise reduction processing.

In an application scenario, the obtained transmission coefficients of the pilot channels may be used to obtain a transmission coefficient of a data channel closest to a pilot symbol through linear interpolation; the obtained transmission coefficient of the data channel is used to obtain transmission coefficients of other data channels closest to the data channel through linear interpolation. The process may be repeated where the obtained transmission coefficients of the data channels adjacent to the data channels whose transmission coefficients have not been obtained are used to obtain through linear interpolation the transmission coefficients of the data channels whose transmission coefficients have not been obtained, until transmission coefficients of data channels in all OFDM symbols that do not carry pilot frequencies between two OFDM symbols that carry pilot frequencies are obtained.

In another application scenario, the obtained transmission coefficients of the pilot channels may be used to obtain a transmission coefficient of a data channel closest to a pilot symbol through linear interpolation; the transmission coefficient of the data channel is used to perform equalization and hard decision for a corresponding received frequency domain signal on the data channel; hard decision data obtained through hard decision and the corresponding received frequency domain signal on the data channel are used for channel estimation to obtain a transmission coefficient with elevated precision on the data channel; the transmission coefficient with elevated precision on the data channel is used to obtain transmission coefficients of other data channels closest to the data channel through linear interpolation. Further, if transmission coefficients of other data channels have not been obtained, the process may be repeated. The transmission coefficients with elevated precision on the data channels adjacent to the data channels whose transmission coefficients have not been obtained are used to obtain through linear interpolation the transmission coefficients of the data channels whose transmission coefficients have not been obtained, until transmission coefficients of data channels in all OFDM symbols that do not carry pilot frequencies between two OFDM symbols that carry pilot frequencies are obtained.

If the data in the received signal needs to be restored, the obtained transmission coefficients with high precision on data channels may be output to an equalizer for data detection to restore the data.

This embodiment further provides a simulation effect diagram of a computer based on certain simulation conditions to show the performance improvement obtained by using the solutions according to the embodiments of the present invention.

(1) Simulation Conditions

During simulation, a simulation system based on the LTE-TDD OFDMA transmission standard is mainly used to test the performance of the channel estimation method proposed in this embodiment of the present invention.

The specific parameters areas follows: number of subcarriers $N=1024$, number of effective subcarriers in the system $N_{used}=600$, and cyclic prefix length $N_{CP}=N/8$. The single-antenna mode, 16QAM modulation, and ZF receiver are used, and initial channel estimation on a pilot subcarrier by using an LS algorithm is taken for example.

In the simulation, the radio channel model uses the one-path Rician channel (channel Rician factor $k=9$) and multi-path Rician channel. The multi-path Rician channel model is as follows: The delays for all paths are [0, 0, 110, 190, 410] ns, and the powers of the paths are [0, −6.51, −16.27, −25.71, −29.31] dB.

The system sampling frequency is 15.36 MHz, the carrier frequency is 2.3 GHz, and the maximum train speed reaches 350 km/h.

(2) Simulation Result

The simulation result provides performance comparison in terms of the system bit error rate and frame error rate curves. FIG. 9 to FIG. 14 show the simulation results for comparison between the bit error rates (BER, Bit Error Rate) and frame error rates (FER, Frame Error Rate) obtained separately by using the prior art (LS+linear interpolation method), the ideal pilot sub-channel+linear interpolation method, and the channel estimation method in the embodiments of the present invention according to the simulation parameter settings and channel model conditions in (1).

Figure 9:
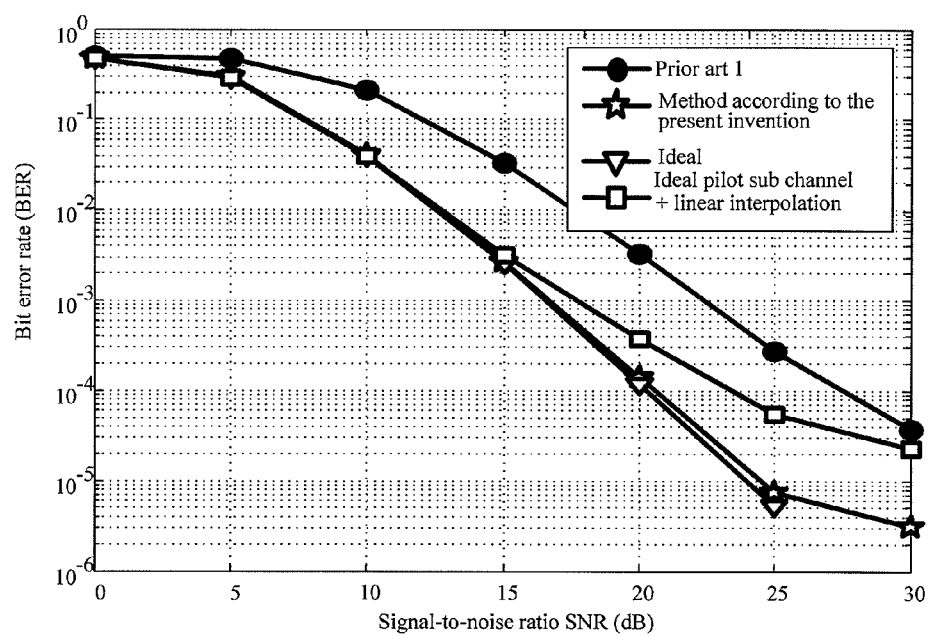
FIG. 9 is a schematic diagram of comparison of channel estimation performance according to an embodiment of the present invention.
Figure 10:
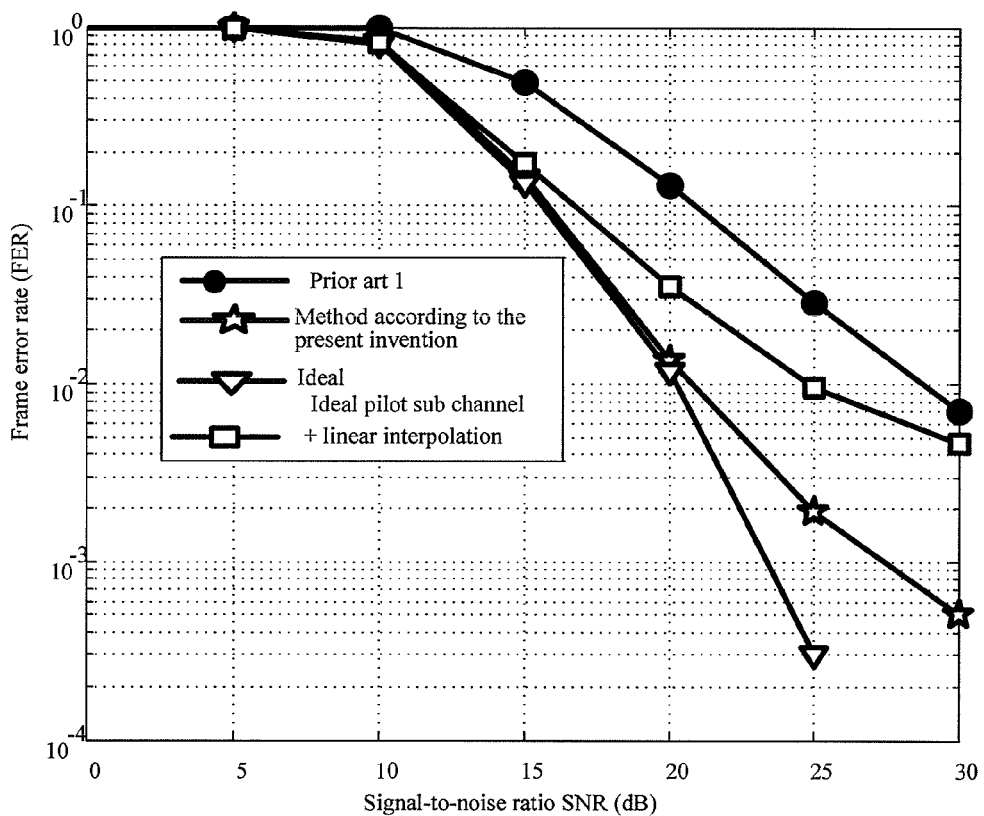
FIG. 10 is another schematic diagram of comparison of channel estimation performance according to an embodiment of the present invention.

FIG. 9 and FIG. 10 show system performance curves obtained by using the channel estimation results of the sum and average noise reduction mode (corresponding to step A4)+hard decision processing (corresponding to steps C1 to C3) in the method according to the present invention for channels with weak frequency selectivity. FIG. 11 to FIG. 14 show system performance curves obtained by using the channel estimation results of the M-resource block sum and average noise reduction mode (corresponding to step A4)+hard decision processing (corresponding to steps C1 to C3) in the method according to the present invention for channels with moderate frequency selectivity, where $M=6$.

FIG. 9 shows bit error rate (BER) performance curves obtained through ZF equalization and data demodulation for channel estimation results obtained in three scenarios, that is, when the prior art (LS+linear interpolation), the ideal pilot sub-channel+linear interpolation method, and the present invention are used, and the BER performance curve obtained through ZF equalization and data demodulation in ideal channel estimation for one-path Rician channels (channel Rician factor $k=9$). As shown in the figure, compared with the case where the prior art is used, the system BER performance obtained through the channel estimation result according to the present invention is improved by about 5 dB in terms of signal-to-noise ratio. As the signal-to-noise ratio increases, the advantages of the present invention are more and more apparent. Compared with the pilot sub-channel+linear interpolation method, the method according to the present invention improves the signal-to-noise ratio by 1 or 2 dB. Especially in a high signal-to-noise ratio, the performance advantage of the present invention is more apparent. In addition, the system BER performance obtained through the channel estimation result according to the present invention is almost consistent with the system performance in ideal channels.

FIG. 10 shows frame error rate (FER) performance curves obtained through ZF equalization and data demodulation for channel estimation results obtained in three scenarios, that is, when the prior art, the ideal pilot sub-channel+linear interpolation method, and the channel estimation method according to the present invention are used, and the FER performance curve obtained through ZF equalization and data demodulation in ideal channel estimation for one-path Rician channels (channel Rician factor k=9). As shown in FIG. 10, compared with the case where the prior art is used, a lower FER may be obtained by using the channel estimation results according to the present invention. When the system performance reaches 10-1, the system FER performance obtained through the channel estimation result according to the present invention is improved by about 5 dB in terms of signal-to-noise ratio compared with the prior art. As the signal-to-noise ratio increases, the advantages of the present invention are more and more apparent, especially in the case of a high signal-to-noise ratio. Compared with the ideal pilot sub-channel+linear interpolation method, the method according to the present invention is improved by multiple dBs in terms of signal-to-noise ratio. In addition, when the signal-to-noise ratio is not larger than 20 dB, the system FER performance obtained through the channel estimation result according to the present invention is almost consistent with that in ideal channels.

Figure 11:
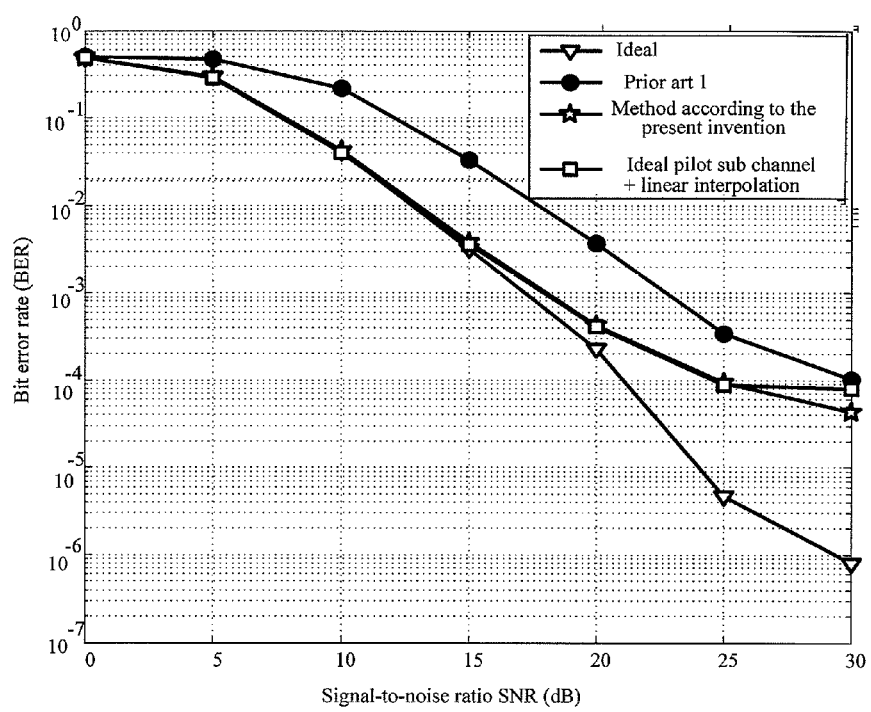
FIG. 11 is another schematic diagram of comparison of channel estimation performance according to an embodiment of the present invention.

FIG. 11 shows bit error rate (BER) performance curves obtained through ZF equalization and data demodulation for channel estimation results obtained in three scenarios, that is, when the prior art, the ideal pilot sub-channel+linear interpolation method, and the channel estimation method according to the present invention are used, and the BER performance curve obtained through ZF equalization and data demodulation in ideal channel estimation for one-path Rician channels (channel Rician factor k=9). As shown in FIG. 11, compared with the prior art, the system BER performance obtained through the channel estimation result according to the present invention is improved by about 5 dB in terms of signal-to-noise ratio. When the signal-to-noise ratio is lower than 15 dB, the system BER performance obtained through the channel estimation result according to the present invention is almost consistent with the system performance in ideal channels. When the signal-to-noise ratio is lower than 25 dB, the system BER performance obtained through the channel estimation result according to the present invention is almost consistent with the performance when the ideal pilot sub-channel+linear interpolation method is used. As the signal-to-noise ratio grows, the performance of this method is better than the performance of the ideal pilot sub-channel+linear interpolation method.

Figure 12:
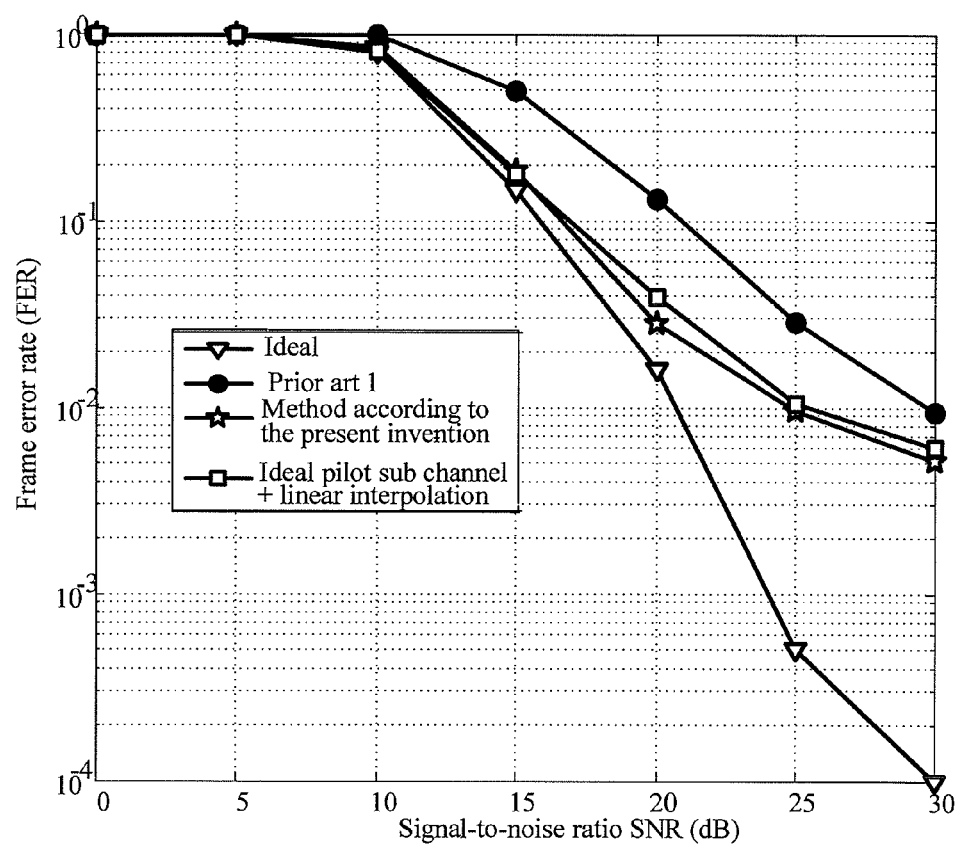
FIG. 12 is another schematic diagram of comparison of channel estimation performance according to an embodiment of the present invention.

FIG. 12 shows frame error rate (FER) performance curves obtained through ZF equalization and data demodulation for channel estimation results obtained in three scenarios, that is, when the prior art, the ideal pilot sub-channel+linear interpolation method, and the channel estimation method according to the present invention are used, and the FER performance curve obtained through ZF equalization and data demodulation in ideal channel estimation for one-path Rician channels (channel Rician factor k=9). As shown in FIG. 12, compared with the case where the prior art is used, when the system performance obtained through the channel estimation result according to the present invention reaches 10-1, the signal-to-noise ratio is improved by about 4 dB. As the signal-to-noise ratio grows, the system performance obtained by using the method according to the present invention is better than the system performance obtained by using the prior art. The system FER performance obtained by using this method is better than the system performance obtained by using the ideal pilot sub-channel+linear interpolation method in terms of signal-to-noise ratio. In addition, when the signal-to-noise ratio is lower than 20 dB, the system FER performance obtained by using the method according to the present invention is about 1 dB worse than the system performance in ideal channels.

Figure 13:
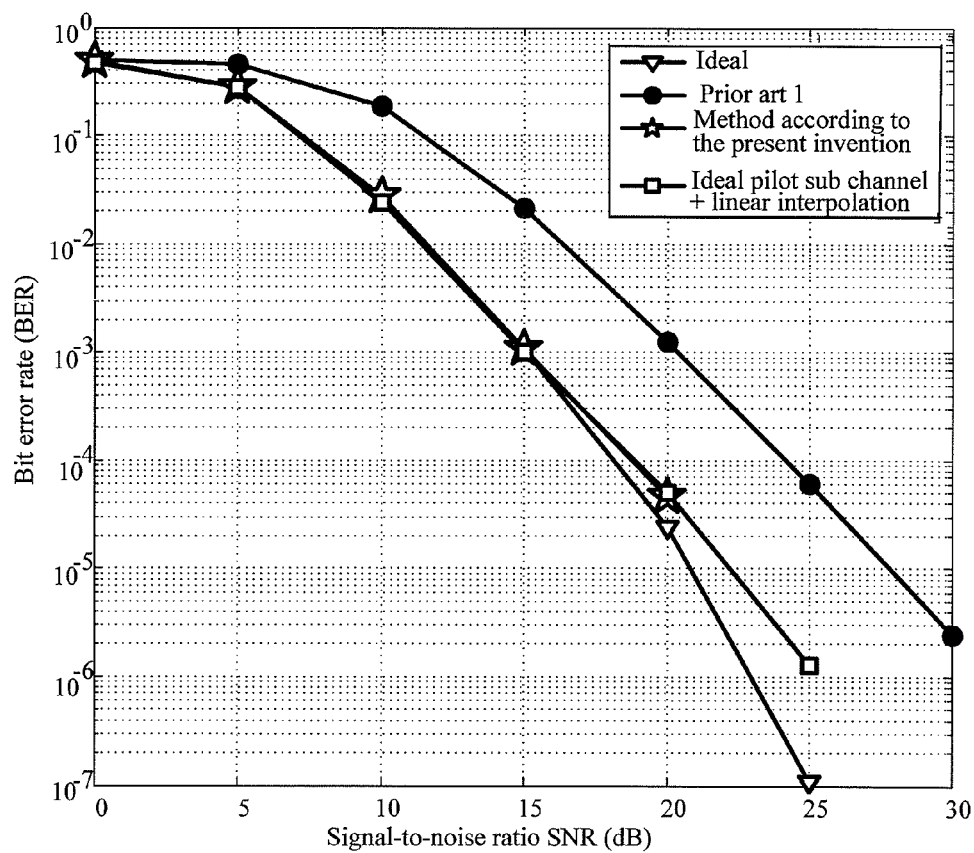
FIG. 13 is another schematic diagram of comparison of channel estimation performance according to an embodiment of the present invention.

As the channel Rician factor grows, the frequency selectivity of a channel becomes weak. In this case, better channel estimation results will be obtained by using the method according to the present invention, as shown in FIG. 13 and FIG. 14. FIG. 13 shows bit error rate (BER) performance curves obtained through ZF equalization and data demodulation for channel estimation results obtained in three scenarios, that is, when the prior art, the ideal pilot sub-channel+linear interpolation method, and the channel estimation method according to the present invention are used, and the BER performance curve obtained through ZF equalization and data demodulation in ideal channel estimation for one-path Rician channels (channel Rician factor k=18). As shown in FIG. 13, compared with the case when the prior art is used, a lower BER may be obtained by using the channel estimation result according to the present invention, and the signal-to-noise ratio is improved by about 5 dB compared with the prior art. As the signal-to-noise ratio grows, the performance obtained by using the channel estimation result according to the present invention is more and more superior to the system BER performance obtained by using the channel estimation result according to the prior art. The system FER performance obtained by using the channel estimation result according to the present invention is almost consistent with the system performance obtained by using the ideal pilot sub-channel+linear interpolation method. In addition, the system performance obtained by using the channel estimation result according to the present invention is approximate to the system BER performance in ideal channels when the signal-to-noise ratio is lower than 20 dB, and is only 1 or 2 dB worse in the case of a high signal-to-noise ratio.

FIG. 14 shows frame error rate (FER) performance curves obtained through ZF equalization and data demodulation for channel estimation results obtained in three scenarios, that is, when the prior art, the ideal pilot sub-channel+linear interpolation method, and the channel estimation method according to the present invention are used, and the FER performance curve obtained through ZF equalization and data demodulation in ideal channel estimation for one-path Rician channels (channel Rician factor k=18). As shown in FIG. 14, compared with the case when the prior art is used, a lower FER may be obtained by using the channel estimation result according to the present invention, and the signal-to-noise ratio is improved by about 5 dB compared with the prior art. As the signal-to-noise ratio grows, the performance obtained by using the channel estimation result according to the present invention is more and more superior to the system FER performance obtained by using the channel estimation result according to the prior art. The system FER performance obtained by using the channel estimation result according to the present invention is about 1 dB better than the system performance obtained by using the ideal pilot sub-channel+linear interpolation method. In addition, the system performance obtained by using the channel estimation result according to the present invention is almost consistent with the system FER performance in ideal channels.

As such, according to this embodiment, the pilot data extracted from the received signal is used for pilot channel estimation to obtain transmission coefficients of multiple groups of pilot channels followed by noise reduction processing, and then the obtained transmission coefficients of the multiple groups of pilot channels that have undergone noise reduction processing are used to obtain the transmission coefficient of the data channel through non-linear interpolation processing. Acquiring the transmission coefficient of the data channel through non-linear interpolation processing by using the transmission coefficients of pilot channels that have undergone noise reduction processing helps improve the channel estimation precision in a fast time-changing channel environment and thereby helps improve the system performance.

In addition, during non-linear interpolation processing between pi lot symbols, introducing a hard decision processing mechanism may further improve precision of a transmission coefficient of a data channel.

To help better implement the technical solutions according to the embodiments of the present invention, the following further provides an apparatus that is configured to implement the channel estimation method.

Referring to FIG. 15-a, a channel estimation apparatus 1500 provided in an embodiment of the present invention may include:

a pilot extracting module 1510, configured to extract pilot data in a received signal;

a pilot channel estimation module 1520, configured to perform pilot channel estimation by using the pilot data extracted by the pilot extracting module 1510 to obtain transmission coefficients of multiple groups of pilot channels; and a data channel estimation module 1530, configured to obtain a transmission coefficient of a data channel through non-linear interpolation processing by using the transmission coefficients of the multiple groups of pilot channels obtained by the pilot channel estimation module 1520.

In an application scenario, referring to FIG. 15-b, the channel estimation apparatus 1500 may further include:

a pilot noise reduction module 1540, configured to perform noise reduction processing for the transmission coefficients of the multiple groups of pilot channels obtained by the pilot channel estimation module 1520, where the data channel estimation module 1530 may be specifically configured to obtain the transmission coefficient of the data channel through non-linear interpolation processing by using the transmission coefficients of the multiple groups of pilot channels that are obtained by the pilot channel estimation module 1520 and have undergone noise reduction processing by the pilot noise reduction module 1540.

In an application scenario, the pilot noise reduction module 1540 may include: a first noise reduction sub-module, and/or a second noise reduction sub-module (not illustrated in the figure).

The first noise reduction sub-module is configured to separately perform sum and average noise reduction processing for the transmission coefficients of the pilot channels on each OFDM symbol obtained by the pilot channel estimation module 1520 to obtain the corresponding transmission coefficient of the pilot channel that has undergone noise reduction processing on each OFDM symbol that carries a pilot frequency.

The second noise reduction sub-module is configured to use the transmission coefficients of the pilot channels obtained by the pilot channel estimation module 1520 to obtain the transmission coefficients of the data channels on the OFDM symbols that carry pilot frequencies; and perform sum and average noise reduction processing for the channel transmission coefficients of the OFDM symbols that carry pilot frequencies in the unit of M-resource blocks to obtain the corresponding transmission coefficient of the pilot channel that has undergone noise reduction processing on each OFDM symbol that carries a pilot frequency.

In another application scenario, the pilot noise reduction module 1540 may include: a relevance sorting sub-module, a domain transforming sub-module, a transform domain noise reduction module, and a domain inverse transforming sub-module (not illustrated in the figure).

The relevance sorting sub-module is configured to sort the transmission coefficients of the multiple groups of pilot channels obtained by the pilot channel estimation module 1520 according to time-frequency correlation.

The domain transforming sub-module is configured to transform the transmission coefficients of the multiple groups of pilot channels sorted by the relevance sorting sub-module to a transform domain.

The transform domain noise reduction module is configured to perform transform domain noise reduction processing for the transmission coefficients of the multiple groups of pilot channels transformed by the domain transforming sub-module to the transform domain.

The domain inverse transforming sub-module is configured to transform the transmission coefficients of the multiple groups of pilot channels after transform domain noise reduction processing by the transform domain noise reduction module to a frequency domain to obtain the transmission coefficients of the multiple groups of pilot channels that have undergone noise reduction processing in the corresponding frequency domain.

In an application scenario, the relevance sorting sub-module may include: a first relevance sorting sub-module or a second relevance sorting sub-module (not illustrated in the figure).

The first relevance sorting sub-module is configured to sort the transmission coefficients of the multiple groups of pilot channels obtained by the pilot channel estimation module 1520 according to time domain correlation values before sorting them according to frequency domain correlation values.

The second relevance sorting sub-module is configured to sort the transmission coefficients of the multiple groups of pilot channels obtained by the pilot channel estimation module 1520 according to frequency domain correlation values before sorting them according to time domain correlation values.

In an application scenario, the transform domain noise reduction module may be specifically configured to perform transform domain noise reduction processing for the transmission coefficients of the multiple groups of pilot channels transformed to the transform domain by using a filter noise reduction or threshold noise reduction mode.

In an application scenario, the data channel estimation module 1530 may include: a first interpolation sub-module, a hard decision sub-module, a high-precision estimation sub-module, and a second interpolation sub-module (not illustrated in the figure).

The first interpolation sub-module is configured to use the obtained transmission coefficients of the pilot channels to obtain a transmission coefficient of a data channel closest to a pilot symbol through linear interpolation.

The hard decision sub-module is configured to use the transmission coefficient of the data channel obtained by the first interpolation sub-module to perform equalization and hard decision for a corresponding received frequency domain signal on the data channel.

The high-precision estimation sub-module is configured to use hard decision data obtained through hard decision by the hard decision sub-module and the corresponding received frequency domain signal on the data channel for channel estimation to obtain a transmission coefficient with elevated precision on the data channel.

The second interpolation sub-module is configured to use the transmission coefficient with elevated precision on the data channel obtained by the high-precision estimation sub-module to obtain transmission coefficients of other data channels closest to the data channel through linear interpolation.

Further, if transmission coefficients of other data channels have not been obtained, the process may be repeated. The second interpolation sub-module uses the transmission coefficients with elevated precision of the data channels adjacent to the data channels whose transmission coefficients have not been obtained, which are obtained by the high-precision estimating sub-module, to obtain through linear interpolation the transmission coefficients of the data channels whose transmission coefficients have not been obtained, until transmission coefficients of data channels in all OFDM symbols that do not carry pilot frequencies between two OFDM symbols that carry pilot frequencies are obtained.

It should be noted that the channel estimation apparatus 1500 according to this embodiment may be configured to implement all the technical solutions in the above method embodiments, where the functions of each functional module may be specifically implemented according to the method in the above method embodiments. For the specific implementation processes, reference may be made to relevant descriptions in the above embodiments, and the details are not described herein again.

As such, according to this embodiment, the channel estimation apparatus 1500 uses the pilot data extracted from the received signal for pilot channel estimation to obtain transmission coefficients of multiple groups of pilot channels, and then uses the obtained transmission coefficients of the multiple groups of pilot channels to obtain the transmission coefficient of the data channel through non-linear interpolation processing. Acquiring the transmission coefficient of the data channel based on the non-linear interpolation processing mechanism helps improve the channel estimation precision in a fast time-changing channel environment and thereby helps improve the system performance.

Further, during non-linear interpolation processing between pilot symbols by the channel estimation apparatus 1500, introducing a hard decision processing mechanism may further improve precision of a transmission coefficient of a data channel.

Referring to FIG. 16, a channel estimation apparatus 1600 provided in an embodiment of the present invention may include:

a second pilot extracting module 1610, configured to extract pilot data in a received signal;

a second pilot channel estimation module 1620, configured to perform pilot channel estimation by using the pilot data extracted by the second pilot extracting module 1610 to obtain transmission coefficients of multiple groups of pilot channels;

a second pilot noise reduction module 1630, configured to perform noise reduction processing for the transmission coefficients of the multiple groups of pilot channels obtained by the second pilot channel estimation module 1620; and a second data channel estimation module 1640, configured to obtain a transmission coefficient of a data channel through linear or non-linear interpolation processing by using the transmission coefficients of the multiple groups of pilot channels after noise reduction processing by the second pilot noise reduction module 1630.

In an application scenario, the second pilot noise reduction module 1630 may include: a first noise reduction sub-module, and/or a second noise reduction sub-module (not illustrated in the figure).

The first noise reduction sub-module is configured to separately perform sum and average noise reduction processing for the transmission coefficients of the pilot channels on each OFDM symbol obtained by the second pilot channel estimation module 1620 to obtain the corresponding transmission coefficient of the pilot channel that has undergone noise reduction processing on each OFDM symbol that carries a pilot frequency.

The second noise reduction sub-module is configured to use the transmission coefficients of the pilot channels obtained by the second pilot channel estimation module 1620 to obtain the transmission coefficients of the data channels on the OFDM symbols that carry pilot frequencies; and perform sum and average noise reduction processing for the channel transmission coefficients of the OFDM symbols that carry pilot frequencies in the unit of M-resource blocks to obtain the corresponding transmission coefficient of the pilot channel that has undergone noise reduction processing on each OFDM symbol that carries a pilot frequency.

In another application scenario, the second pilot noise reduction module 1630 may include: a relevance sorting sub-module, a domain transforming sub-module, a transform domain noise reduction module, and a domain inverse transforming sub-module (not illustrated in the figure).

The relevance sorting sub-module is configured to sort the transmission coefficients of the multiple groups of pilot channels obtained by the second pilot channel estimation module 1620 according to time-frequency correlation.

The domain transforming sub-module is configured to transform the transmission coefficients of the multiple groups of pilot channels sorted by the relevance sorting sub-module to a transform domain.

The transform domain noise reduction module is configured to perform transform domain noise reduction processing for the transmission coefficients of the multiple groups of pilot channels transformed by the domain transforming sub-module to the transform domain.

The domain inverse transforming sub-module is configured to transform the transmission coefficients of the multiple groups of pilot channels after transform domain noise reduction processing by the transform domain noise reduction module to a frequency domain to obtain the transmission coefficients of the multiple groups of pilot channels that have undergone noise reduction processing in the corresponding frequency domain.

In an application scenario, the relevance sorting sub-module may include: a first relevance sorting sub-module or a second relevance sorting sub-module (not illustrated in the figure).

The first relevance sorting sub-module is configured to sort the transmission coefficients of the multiple groups of pilot channels obtained by the second pilot channel estimation module 1620 according to time domain correlation values before sorting them according to frequency domain correlation values.

The second relevance sorting sub-module is configured to sort the transmission coefficients of the multiple groups of pilot channels obtained by the second pilot channel estimation module 1620 according to frequency domain correlation values before sorting them according to time domain correlation values.

In an application scenario, the transform domain noise reduction module may be specifically configured to perform transform domain noise reduction processing for the transmission coefficients of the multiple groups of pilot channels transformed to the transform domain by using a filter noise reduction or threshold noise reduction mode.

In an application scenario, the second data channel estimation module 1640 may include: a first interpolation sub-module, a hard decision sub-module, a high-precision estimation sub-module, and a second interpolation sub-module (not illustrated in the figure).

The first interpolation sub-module is configured to use the transmission coefficients of the pilot channels obtained after noise reduction processing by the second pilot noise reduction module 1630 to obtain a transmission coefficient of a data channel closest to a pilot symbol through linear interpolation.

The hard decision sub-module is configured to use the transmission coefficient of the data channel obtained by the first interpolation sub-module to perform equalization and hard decision for a corresponding received frequency domain signal on the data channel.

The high-precision estimation sub-module is configured to use hard decision data obtained through hard decision by the hard decision sub-module and the corresponding received frequency domain signal on the data channel for channel estimation to obtain a transmission coefficient with elevated precision on the data channel.

The second interpolation sub-module is configured to use the transmission coefficient with elevated precision on the data channel obtained by the high-precision estimation sub-module to obtain transmission coefficients of other data channels closest to the data channel through linear interpolation.

Further, if transmission coefficients of other data channels have not been obtained, the process may be repeated. The second interpolation sub-module uses the transmission coefficients with elevated precision of the data channels adjacent to the data channels whose transmission coefficients have not been obtained, which are obtained by the high-precision estimating sub-module, to obtain through linear interpolation the transmission coefficients of the data channels whose transmission coefficients have not been obtained, until transmission coefficients of data channels in all OFDM symbols that do not carry pilot frequencies between two OFDM symbols that carry pilot frequencies are obtained.

It should be noted that the channel estimation apparatus 1600 according to this embodiment may be configured to implement all the technical solutions in the above method embodiments, where the functions of each functional module may be specifically implemented according to the method in the above method embodiments. For the specific implementation processes, reference may be made to relevant descriptions in the above embodiments, and the details are not described herein again.

As such, according to this embodiment, the channel estimation apparatus 1600 uses the pilot data extracted from the received signal for pilot channel estimation to obtain transmission coefficients of multiple groups of pilot channels followed by noise reduction processing, and then uses the obtained transmission coefficients of the multiple groups of pilot channels that have undergone noise reduction processing to obtain the transmission coefficient of the data channel through linear or non-linear interpolation processing. Acquiring the transmission coefficient of the data channel through interpolation processing by using the transmission coefficients of pilot channels that have undergone noise reduction processing helps improve the channel estimation precision in a fast time-changing channel environment and thereby helps improve the system performance.

It should be noted that, for brevity, the above method embodiments are expressed as a series of actions. However, those skilled in the art should appreciate that the present invention is not limited to the order of the described actions, because according to the present invention, some steps may be performed in other orders or concurrently. Next, those skilled in the art should also appreciate that all the embodiments described in the specification are exemplary embodiments, and that the involved actions and modules are not necessarily required by the present invention.

In the embodiments, the description in each embodiment has its own focus. For the part that is not described in a certain embodiment, reference may be made to relevant descriptions in other embodiments. All the embodiments may also be combined to obtain new embodiments, which are not described in detail herein.

In summary, according to a technical solution provided in the embodiments of the present invention, the pilot data extracted from the received signal is used for pilot channel estimation to obtain transmission coefficients of multiple groups of pilot channels, and then the obtained transmission coefficients of the multiple groups of pilot channels are used to obtain the transmission coefficient of the data channel through non-linear interpolation processing. Acquiring the transmission coefficient of the data channel based on the non-linear interpolation processing mechanism helps improve the channel estimation precision in a fast time-changing channel environment and thereby helps improve the system performance.

According to another technical solution provided in the embodiments of the present invention, the pilot data extracted from the received signal is used for pilot channel estimation to obtain transmission coefficients of multiple groups of pilot channels followed by noise reduction processing, and then the obtained transmission coefficients of the multiple groups of pilot channels that have undergone noise reduction processing are used to obtain the transmission coefficient of the data channel through non-linear interpolation processing. Acquiring the transmission coefficient of the data channel through non-linear interpolation processing by using the transmission coefficients of pilot channels that have undergone noise reduction processing helps improve the channel estimation precision in a fast time-changing channel environment and thereby helps improve the system performance.

In addition, during non-linear interpolation processing between pilot symbols, introducing a hard decision processing mechanism may further improve precision of a transmission coefficient of a data channel.

Those of ordinary skill in the art may understand that all or a part of steps of various methods in the foregoing embodiments may be implemented by a program instructing relevant hardware. The program may be stored in a computer readable storage medium. The storage medium may include a read-only memory (ROM, Read-Only Memory), a random access memory (RAM, Random Access Memory), a magnetic disk, or an optical disk, and so on.

A channel estimation method and apparatus that are provided in the embodiments of the present invention are introduced in detail in the foregoing. In this specification, specific examples are used for illustrating principles and implementation manners of the present invention. The foregoing descriptions of the embodiments are merely intended to help understand the methods of the present invention and the core idea thereof. Meanwhile, those of ordinary skill in the art may make modifications to the specific implementation manners and application scopes according to the idea of the present invention. In conclusion, the content of the specification shall not be construed as a limitation to the present invention.

What is claimed is:

1. A channel estimation method, comprising:
   extracting pilot data in a received signal;
   performing pilot channel estimation by using the extracted pilot data to obtain transmission coefficients of multiple groups of pilot channels; and obtaining a transmission coefficient of a data channel through non-linear interpolation processing by using the obtained transmission coefficients of the multiple groups of pilot channels; using the obtained transmission coefficients of the pilot channels to obtain a transmission coefficient of a data channel closest to a pilot symbol through linear interpolation; using the transmission coefficient of the data channel to perform equalization and hard decision for a corresponding received frequency domain signal on the data channel; using hard decision data obtained through hard decision and the corresponding received frequency domain signal on the data channel for channel estimation to obtain a transmission coefficient with elevated precision on the data channel; and using the transmission coefficient with elevated precision on the data channel to obtain transmission coefficients of other data channels closest to the data channel through linear interpolation.

2. The method according to claim 1, wherein the method further comprises: performing noise reduction processing for the obtained transmission coefficients of the multiple groups of pilot channels; and
obtaining a transmission coefficient of a data channel through non-linear interpolation processing by using the obtained transmission coefficients of the multiple groups of pilot channels comprises:
obtaining the transmission coefficient of the data channel through non-linear interpolation processing by using the obtained transmission coefficients of the multiple groups of pilot channels that have undergone noise reduction processing.

3. The method according to claim 2, wherein performing noise reduction processing for the obtained transmission coefficients of the multiple groups of pilot channels comprises:
separately performing sum and average noise reduction processing for the obtained transmission coefficients of the pilot channels on each orthogonal frequency division multiplexing OFDM symbol to obtain the corresponding transmission coefficient of the pilot channel that has undergone noise reduction processing on each OFDM symbol that carries a pilot frequency;
or,
using the obtained transmission coefficients of the pilot channels to obtain the transmission coefficients of the data channels on the OFDM symbols that carry pilot frequencies; and performing sum and average noise reduction processing for the channel transmission coefficients of the OFDM symbols that carry pilot frequencies in the unit of M-resource blocks to obtain the corresponding transmission coefficient of the pilot channel that has undergone noise reduction processing on each OFDM symbol that carries a pilot frequency.

4. The method according to claim 2, wherein performing noise reduction processing for the obtained transmission coefficients of the multiple groups of pilot channels comprises:
sorting the obtained transmission coefficients of the multiple groups of pilot channels according to time-frequency correlation;
transforming the sorted transmission coefficients of the multiple groups of pilot channels to a transform domain;
performing transform domain noise reduction processing for the transmission coefficients of the multiple groups of pilot channels transformed to the transform domain; and
transforming the transmission coefficients of the multiple groups of pilot channels after transform domain noise reduction processing to a frequency domain to obtain the transmission coefficients of the multiple groups of pilot channels that have undergone noise reduction processing in the corresponding frequency domain.

5. The method according to claim 4, wherein sorting the obtained transmission coefficients of the pilot channels according to time-frequency correlation comprises:
sorting the obtained transmission coefficients of the multiple groups of pilot channels according to time domain correlation values before sorting them according to frequency domain correlation values;
or,
sorting the obtained transmission coefficients of the multiple groups of pilot channels according to frequency domain correlation values before sorting them according to time domain correlation values.

6. The method according to claim 4, wherein performing transform domain noise reduction processing for the transmission coefficients of the multiple groups of pilot channels transformed to the transform domain comprises:
performing transform domain noise reduction processing for the transmission coefficients of the multiple groups of pilot channels transformed to the transform domain by using a filter noise reduction or threshold noise reduction mode.

7. A channel estimation apparatus, comprising:
a pilot extracting module, configured to extract pilot data in a received signal;
a pilot channel estimation module, configured to perform pilot channel estimation by using the pilot data extracted by the pilot extracting module to obtain transmission coefficients of multiple groups of pilot channels; and
a data channel estimation module, configured to obtain a transmission coefficient of a data channel through non-linear interpolation processing by using the transmission coefficients of the multiple groups of pilot channels obtained by the pilot channel estimation module, wherein the data channel estimation module comprises:
a first interpolation sub-module, configured to use the obtained transmission coefficients of the pilot channels to obtain a transmission coefficient of a data channel closest to a pilot symbol through linear interpolation;
a hard decision sub-module, configured to use the transmission coefficient of the data channel obtained by the first interpolation sub-module to perform equalization and hard decision for a corresponding received frequency domain signal on the data channel;
a high-precision estimation sub-module, configured to use hard decision data obtained through hard decision by the hard decision sub-module and the corresponding received frequency domain signal on the data channel for channel estimation to obtain a transmission coefficient with elevated precision on the data channel; and
a second interpolation sub-module, configured to use the transmission coefficient with elevated precision on the data channel obtained by the high-precision estimation sub-module to obtain transmission coefficients of other data channels closest to the data channel through linear interpolation.

8. The channel estimation apparatus according to claim 7, further comprising:
a pilot noise reduction module, configured to perform noise reduction processing for the transmission coefficients of the multiple groups of pilot channels obtained by the pilot channel estimation module, wherein the data channel estimation module is configured to obtain the transmission coefficient of the data channel through non-linear interpolation processing by using the transmission coefficients of the multiple groups of pilot channels that are obtained by the pilot channel estimation module and have undergone noise reduction processing by the pilot noise reduction module.

9. The channel estimation apparatus according to claim 8, wherein the pilot noise reduction module comprises at least one of:

a first noise reduction sub-module, configured to separately perform sum and average noise reduction processing for the transmission coefficients of the pilot channels on each OFDM symbol obtained by the pilot channel estimation module to obtain the corresponding transmission coefficient of the pilot channel that has undergone noise reduction processing on each OFDM symbol that carries a pilot frequency; or a second noise reduction sub-module, configured to use the transmission coefficients of the pilot channels obtained by the pilot channel estimation module to obtain the transmission coefficients of the data channels on the OFDM symbols that carry pilot frequencies; and perform sum and average noise reduction processing for the channel transmission coefficients of the OFDM symbols that carry pilot frequencies in the unit of M-resource blocks to obtain the corresponding transmission coefficient of the pilot channel that has undergone noise reduction processing on each OFDM symbol that carries a pilot frequency.

10. The channel estimation apparatus according to claim 8, wherein the pilot noise reduction module comprises:

a relevance sorting sub-module, configured to sort the transmission coefficients of the multiple groups of pilot channels obtained by the pilot channel estimation module according to time-frequency correlation;

a domain transforming sub-module, configured to transform the transmission coefficients of the multiple groups of pilot channels sorted by the relevance sorting sub-module to a transform domain;

a transform domain noise reduction module, configured to perform transform domain noise reduction processing for the transmission coefficients of the multiple groups of pilot channels transformed by the domain transforming sub-module to the transform domain; and a domain inverse transforming sub-module, configured to transform the transmission coefficients of the multiple groups of pilot channels after transform domain noise reduction processing by the transform domain noise reduction module to a frequency domain to obtain the transmission coefficients of the multiple groups of pilot channels that have undergone noise reduction processing in the corresponding frequency domain.

11. The channel estimation apparatus according to claim 10, wherein the relevance sorting sub-module comprises:

a first relevance sorting sub-module, configured to sort the transmission coefficients of the multiple groups of pilot channels obtained by the pilot channel estimation module according to time domain correlation values before sorting them according to frequency domain correlation values;

or, a second relevance sorting sub-module, configured to sort the transmission coefficients of the multiple groups of pilot channels obtained by the pilot channel estimation module according to frequency domain correlation values before sorting them according to time domain correlation values.

12. The channel estimation apparatus according to claim 10, wherein the transform domain noise reduction module is configured to perform transform domain noise reduction processing for the transmission coefficients of the multiple groups of pilot channels transformed to the transform domain by using a filter noise reduction or threshold noise reduction mode.

* * * * *